US012704184B2

(12) United States Patent
Strankman

(10) Patent No.: US 12,704,184 B2
(45) Date of Patent: Aug. 11, 2026

(54) GATE VALVE WITH NOVEL SEAL AND SEALING ARRANGEMENT

(71) Applicant: Edge Mechanical Design Inc., Red Deer (CA)

(72) Inventor: Daine Strankman, Red Deer (CA)

( * ) Notice: Subject to any disclaimer, the term of this patent is extended or adjusted under 35 U.S.C. 154(b) by 0 days.

(21) Appl. No.: 18/618,960

(22) Filed: Mar. 27, 2024

(65) Prior Publication Data

US 2024/0328518 A1 Oct. 3, 2024

Related U.S. Application Data

(60) Provisional application No. 63/454,952, filed on Mar. 27, 2023.

(51) Int. Cl.
*F16K 3/02* (2006.01)

(52) U.S. Cl.
CPC .......... *F16K 3/0227* (2013.01); *F16K 3/0245* (2013.01)

(58) Field of Classification Search
CPC ............................ F16K 3/0227; F16K 3/0245
See application file for complete search history.

(56) References Cited

U.S. PATENT DOCUMENTS

| | | | | |
|---|---|---|---|---|
| 3,069,131 | A * | 12/1962 | Grove | F16K 3/0227 251/327 |
| 3,295,546 | A * | 1/1967 | Carlton | F16K 3/0227 251/327 |
| 7,017,886 | B1 * | 3/2006 | Ngene-Igwe | F16K 3/0227 251/326 |
| 2011/0240156 | A1 * | 10/2011 | Azibi | F16K 3/0227 137/628 |
| 2019/0032793 | A1 * | 1/2019 | Lah | F16K 3/0236 |
| 2019/0338741 | A1 * | 11/2019 | Fletcher | F16K 3/30 |
| 2021/0172537 | A1 * | 6/2021 | Kim | F16K 3/0254 |

* cited by examiner

*Primary Examiner* — Kelsey E Cary
(74) *Attorney, Agent, or Firm* — Sander R. Gelsing

(57) ABSTRACT

In one aspect there is provided a gate valve having a first end and a second end, a gate having a gate opening. The gate is positionable within the valve between a closed configuration, a transition configuration and an open configuration. The gate valve further comprises a gate stem, at least one pair of seals, with one seal positioned on either side of the gate. Each of the seals comprises a first profile and a second profile. The first profile seals the gate valve and blocks fluid from passing between the first end and the second end when the gate valve is in the closed configuration. The second profile seals the gate opening relative to the gate stem. In another embodiment, the gate valve comprises two pairs of seals and the first and second profiles are each provided on separate seals.

7 Claims, 31 Drawing Sheets

*Fig. 1 - PRIOR ART*
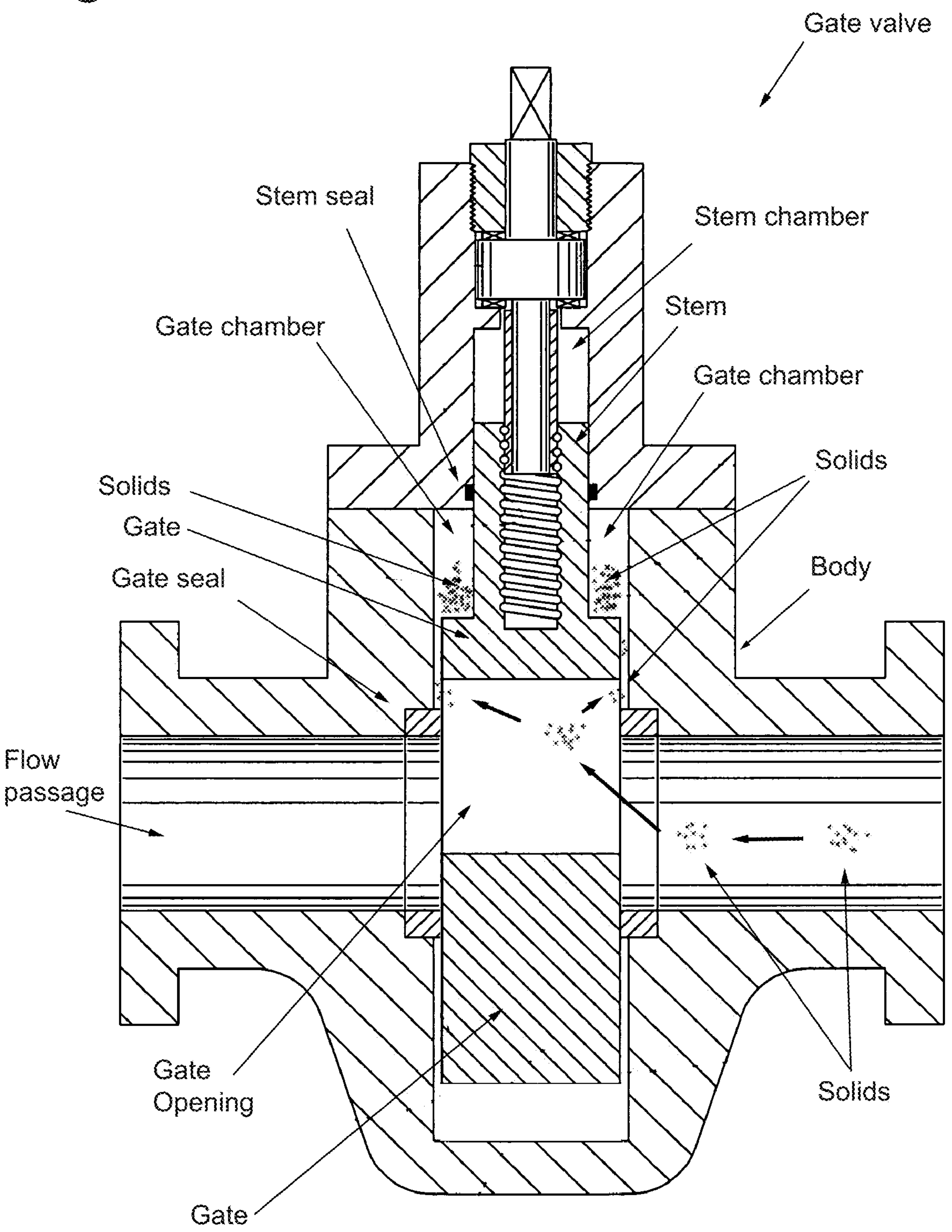

16
10
14
15s
11a,15a
11b,15b
15s
12

10
16
12
14
15b
15a 12
12gf
50,52,54a
12gc
52,
55a
51,53a
51,52
53b,54b 12
12gc
12gf
50,52,
54a
52,55b
51,53a
51,52,
53b,54b

12

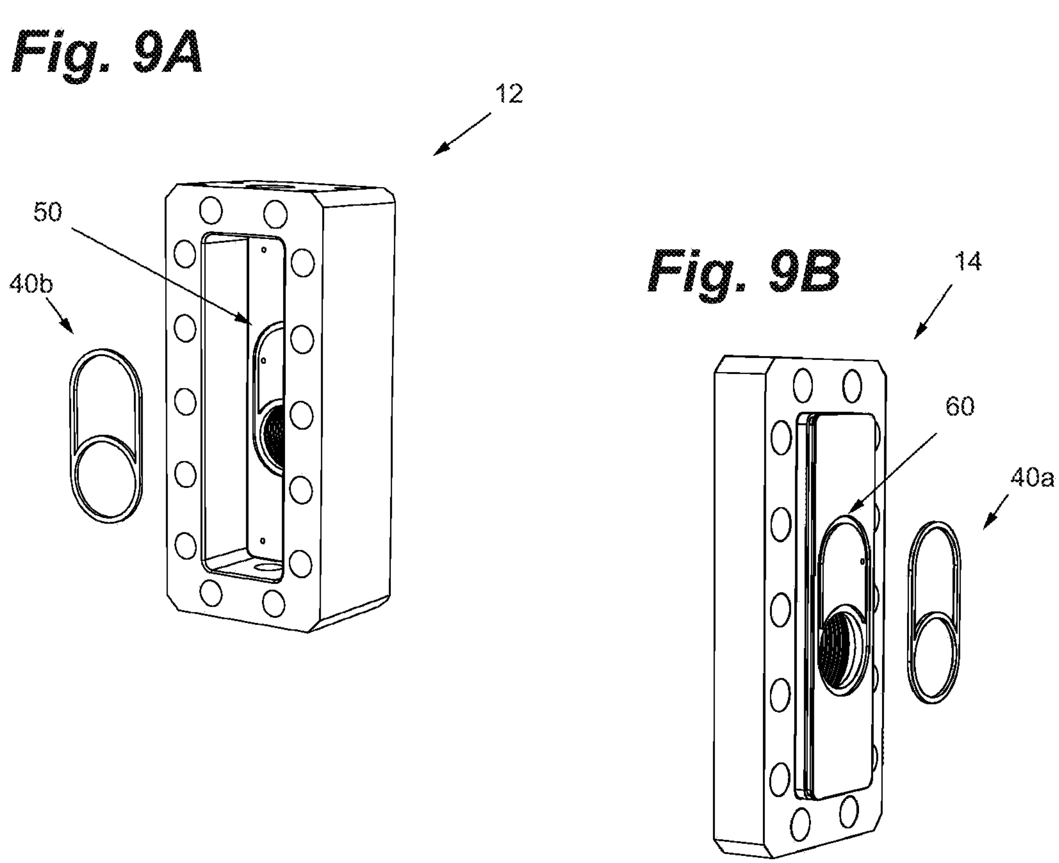
Fig. 9A
12
50
40b
Fig. 9B
14
60
40a
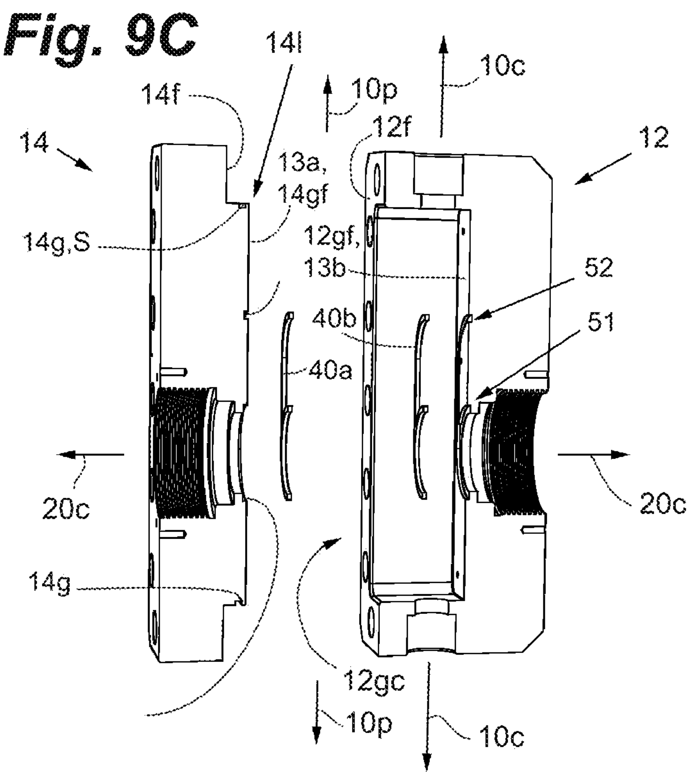
Fig. 9C
14l
10c
10p
14f
12f
14
12
13a,
14gf
14g,S
12gf,
13b
52
40b
51
40a
20c
20c
14g
12gc
10p
10c 40,40p
42,44a
42,45a
42,45b
41,43a
41o
41,42,
43b,44b 40,40p
42,44a
42,45b
42,45a
41,43a
41o
41,42,
43b,44b 100a,100b

10

B

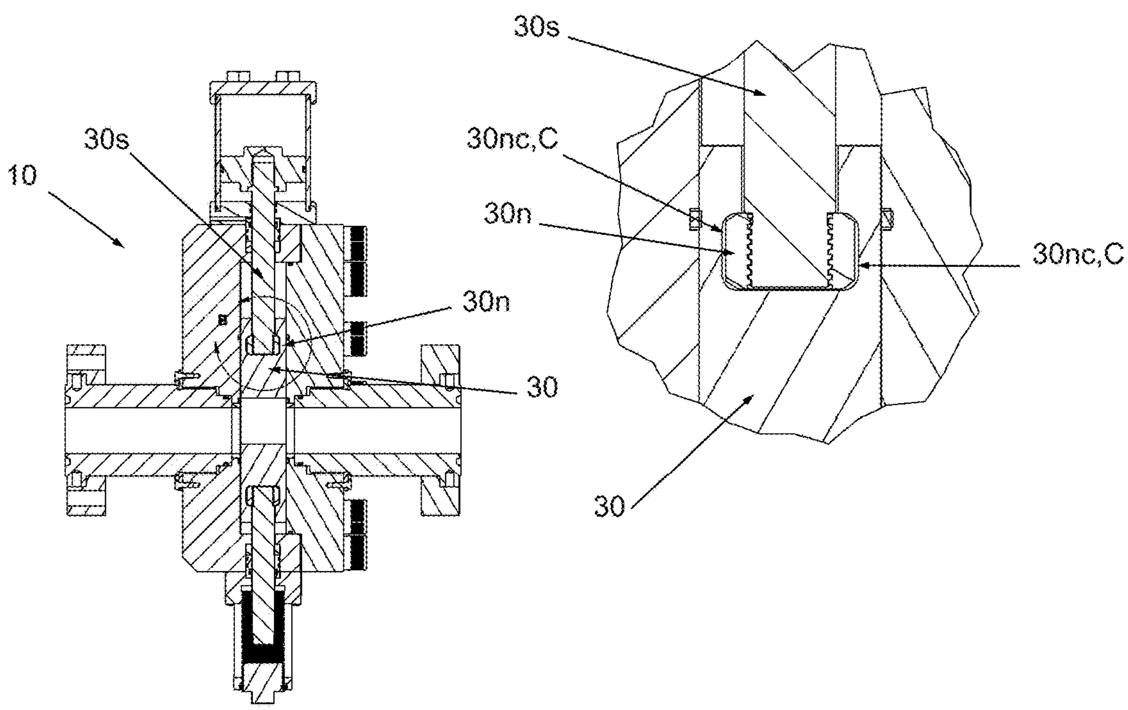
Fig. 15A
Fig. 15B
10
30s
30n
30
B
30nc,C
30n
30nc,C
30s
30
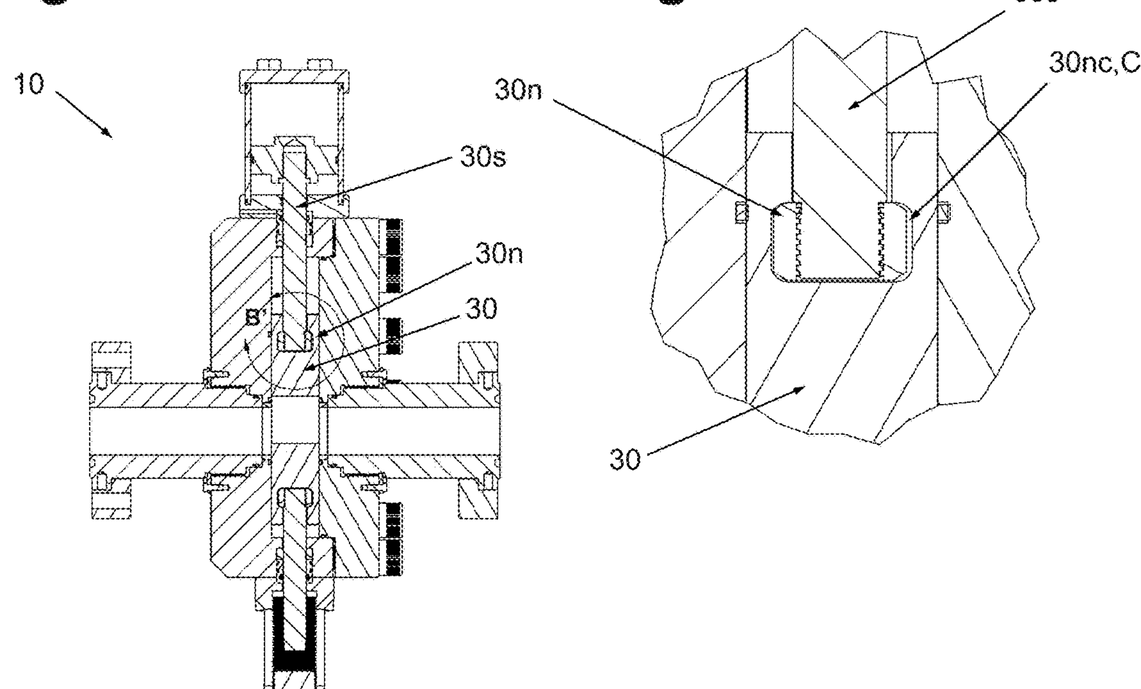
Fig. 15C
Fig. 15D
10
30s
30n
30
B'
30s
30n
30nc,C
30

10
30s
30n
30
B"
30s
30n
30nc,C

GATE VALVE WITH NOVEL SEAL AND SEALING ARRANGEMENT

CROSS REFERENCE TO RELATED APPLICATION

This application is a non-provisional application which claims priority to, and benefit of, U.S. Provisional Patent Application Ser. No. 63/454,952 filed Mar. 27, 2023 and entitled, "Gate Valve with Novel Seal and Sealing Arrangement", the entirety of which is incorporated herein by reference.

FIELD OF THE INVENTION

This invention relates in general to gate valves, and in particular to a gate valve that that has a novel seal and sealing arrangement to prevent suspended solids from passing into a gate valve's gate chamber and collect around the stem of a gate.

BACKGROUND OF THE INVENTION

The background information discussed below is presented to better illustrate the novelty and usefulness of the present invention. This background information is not admitted prior art.

Referring to FIG. 1, a conventional, prior-art gate valve has a body with a cavity or gate chamber that is intersected by a flow passage. A planar member, the gate, moves within the gate chamber between open and closed configurations or positions. When the gate is positioned between the open and closed configurations, it can be said to be in a transition position or configuration. The gate has a hole or gate opening through it that aligns with the flow passage while in the open configuration. The gate can be translated within the gate valve so that the gate opening is in alignment with the flow passageway, i.e. moved to the open configuration in which the gate valve allows fluid to flow through it from one side to the other. However, when the gate is translated to a configuration so that the gate opening within the gate is sufficiently out of alignment and unregistered with the flow passageway, i.e. to the closed configuration, the flow through the gate is substantially blocked such that fluid does not pass from one side of the gate valve to the other.

A circular flow passage seal, gate seal or seat ring is typically provided at each intersection of the flow passage with gate chamber. Gate seals/seat rings are typically metal rings having seal surfaces on their inner faces which are biased against flat faces of the gate when in the closed configuration and thereby creating a sealed arrangement wherein flow from one end of the flow passage to the other end is prevented. Typically, the flat face of the gate that seals will be a downstream side, thus the sealing engagement depends on the direction of flow through flow passage.

One common way of translating the gate within the valve is by manually rotating a hand-wheel. The hand-wheel is typically attached to a threaded area within the gate valve system so that when the wheel turns, it moves a stem attached to the gate and causes the gate to translate linearly within the gate chamber. The stem is typically housed in the gate valve within a stem cavity or stem chamber, as well as within part of the gate chamber (depending on the position of the gate within the valve), as shown in FIG. 1. Another way of translating the gate within the valve is through the use of a hydraulic actuation device acting on the gate via the stem.

Typically, a stem seal is provided in the stem chamber to sealable engage the stem, to seal pressure within the gate chamber and prevent fluids from the flow passage from escaping out the gate valve via the stem chamber. However, fluids from the flow passage will normally still circulate or move through the gate chamber, bypassing the gate seals and collecting up above the gate and around the stem, especially when the gate is partially positioned between the open and closed configurations (see FIG. 1).

Often gate valves carry fluids that contain suspended solids or debris. This is especially so when gate valves are utilized during oil field hydraulic fracturing operations (also known as hydrofracking, fracking, fracing, or hydrofracturing) where fluids passing through a gate valve carry sand, proppants or other solids. These solid particles can clog the gate chamber where they can concentrate, pack and in some cases solidify; especially so above the gate and around the stem. As such, gate valves must be periodically cleaned or flushed out; e.g. with grease forced in the top of the gate chamber and then out into the flow passage.

Moreover, during such flushing procedure it is better if the flow passage is oriented substantially horizontal, and the stem chamber is positioned above the flow passage, to allow the sand, proppants and other solids and debris to be easily flushed downward (and out the flow passage) and prevent them from remaining stuck within the gate chamber and/or around the stem. However, often times it is desirable to orient the flow passage at an angle that is not substantially horizontal (e.g. substantially vertical). In such cases, it is much more difficult, if not impossible, to flush out the sand, proppants or other solids from the stem chamber.

Therefore, what is needed is a gate valve that does not suffer from these disadvantages.

SUMMARY OF THE INVENTION

In an embodiment of the invention, there is provided a gate valve having a first end and a second end, a gate having a gate opening. The gate is positionable within the valve between a closed configuration, a transition configuration and an open configuration. The gate valve further comprise a gate stem, at least one pair of seals, with one seal positioned on either side of the gate. Each of the seals comprises a first profile and a second profile. The first profile seals the gate valve and blocks fluid from passing between the first end and the second end when the gate valve is in the closed configuration. The second profile seals the gate opening relative to the gate stem.

In another embodiment, the gate valve comprises two pairs of seals and the first and second profiles are each provided on separate seals. In a preferred embodiment, the gate valve further comprises a valve main body and a valve end cap.

BRIEF DESCRIPTION OF THE DRAWINGS

Referring to the drawings, several aspects of the present invention are illustrated by way of example, and not by way of limitation, in detail in the figures, wherein:

FIG. 1 is a sectional view of a PRIOR ART gate valve shown in a transition position and illustrating solids buildup in the gate chamber;

FIG. 9A is an exploded perspective view of the gate valve body of the embodiment of FIG. 7A with a preferred embodiment of a flow passage seal;

FIG. 9B is an exploded perspective view of the gate valve cap of the embodiment of FIG. 8A with the embodiment of a flow passage seal of FIG. 9A;

FIG. 9C is an exploded, sectioned perspective view of the gate valve body of the embodiment of FIG. 7A, the gate valve cap of the embodiment of FIG. 8A, and a pair of the flow passage seals of the embodiment of FIG. 9A;

FIG. 15A is a sectioned view of yet another embodiment of the gate valve of the present invention, showing the stem nut centered within the nut cavity;

FIG. 15B is an enlarged view of the area B in FIG. 15A;

FIG. 15C is a sectioned view of the embodiment of FIG. 15A, now showing the stem nut offset to one end within the nut cavity;

FIG. 15D is an enlarged view of the area B' in FIG. 15C;

DETAILED DESCRIPTION OF THE PREFERRED EMBODIMENTS

Figure 2A:
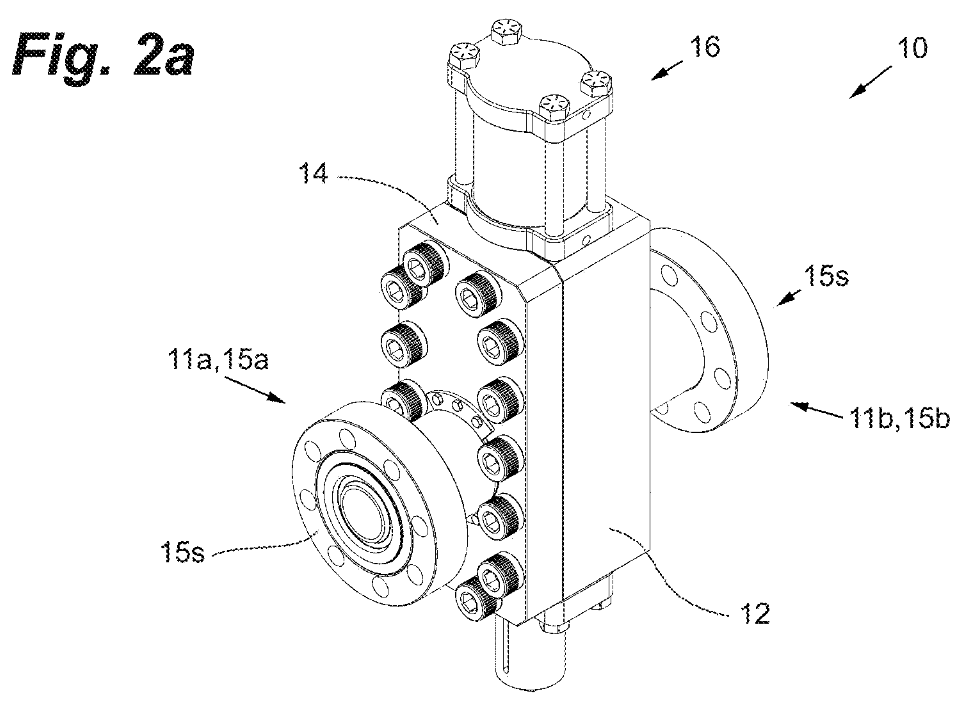
FIG. 2A is a perspective view of a gate valve according to an embodiment of the invention.
Figure 2B:
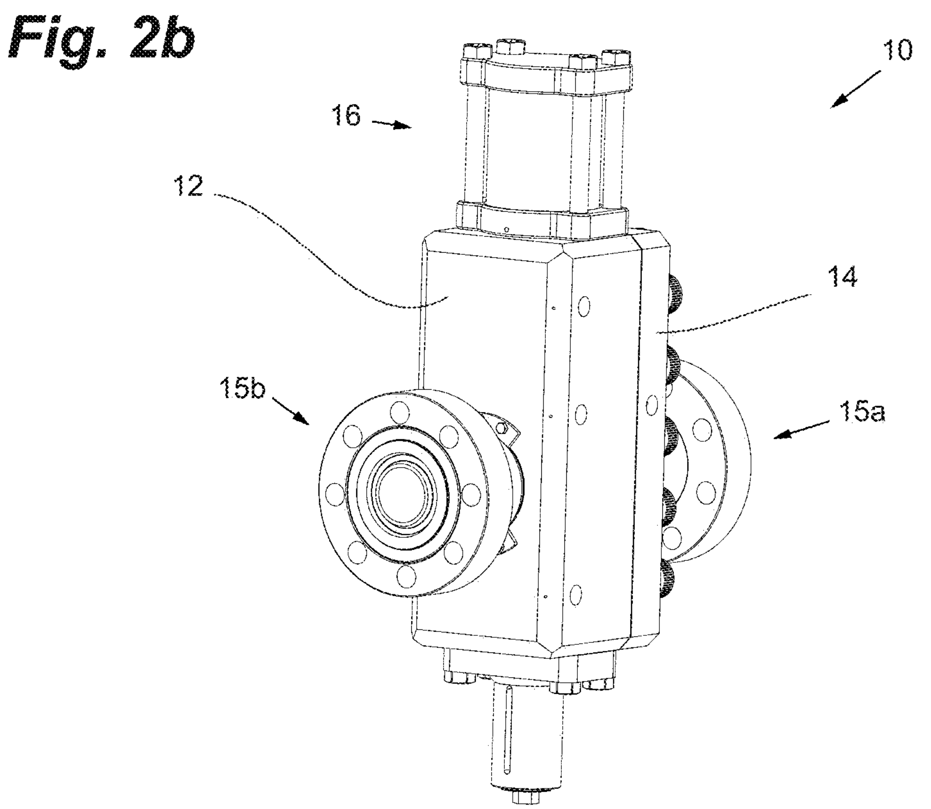
FIG. 2B is another perspective view of the gate valve of the embodiment of FIG. 2A.

The following description is of preferred embodiments by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

Additionally, to assist in the description of the invention, words such as top, bottom, upper, lower, above, below, front, rear, right and left are used to describe the accompanying figures. It will be appreciated, however, that the present invention can be located and positioned in a variety of desired positions and angles, and that the various components can be arranged in other suitable configurations. The terms "comprising," "comprises," "including," "includes," "having," "haves," and their grammatical equivalents are used herein to mean that other components, elements or steps are optionally present.

Reference will now be made in detail to an implementation consistent with the present invention as illustrated in the accompanying figures. For the purpose of clarification, embodiments described herein reference the term "fluid," which refers to a gas, liquid, as well as liquid solution with solid aggregates, as well as any material that can reasonably be expected to flow.

Referring to FIGS. 2A-4C by way of non-limiting example, and consistent with embodiments of the invention, a gate valve 10 is shown. The gate valve 10 includes a valve main body 12, a valve end cap 14, a pair of flanges 15*a*, 15*b* at opposing first and second ends 11*a*, 11*b* of the valve gate valve 10 (one flange projecting radially from each of valve main body 12 and valve cap 14 as illustrated). Flanges 15*a*, 15*b* are designed to accommodate a flange seal (not shown), such as, but not limited to, a metal gasket, on the flange surfaces 15*s* to enable the gate valve 10 to connect to other components with flanges. While this embodiment shows a flange type connection, other ways to provide connections are known within the art and can be designed as appropriate for the gate valve 10 and related equipment.

The valve 10 also has a top valve face 10*t* and a bottom valve face 10*b* to removable attach additional components in a conventional manner, as desired, to the gate valve 10. These additional components may comprise a conventional hydraulic actuation mechanism 16 and a conventional balance rod 17*r* receivable within a conventional balance rod cap 17*c* and provided with a manual (threaded) backup 17*b*. In other embodiments (not shown), the hydraulic actuation mechanism 16 may be replaced with a conventional mechanical actuation mechanism. One of skill in the art will recognize that various commercially available actuation and other mechanisms can be adapted for use with the top valve face 10*t* and the bottom valve face 10*b* of the gate valve 10.

The valve 10 contains a bore or flow passage 20 preferably having a predetermined body bore diameter 20*d* through which fluid can travel when the gate valve 10 is in an open configuration such that there is not substantial restriction to the flow of fluid between first flange 15*a* and second flange 15*b*. The flow passage 20 is preferably symmetric about a bore center-line 20*c* that passes through the valve 10 and through flange 15*a* and flange 15*b*; e.g. through flange 15*a* at a first flow passage end 20*a* and through flange 15*b* at a second flow passage end 20*b* (see FIG. 3A).

Figure 3A:
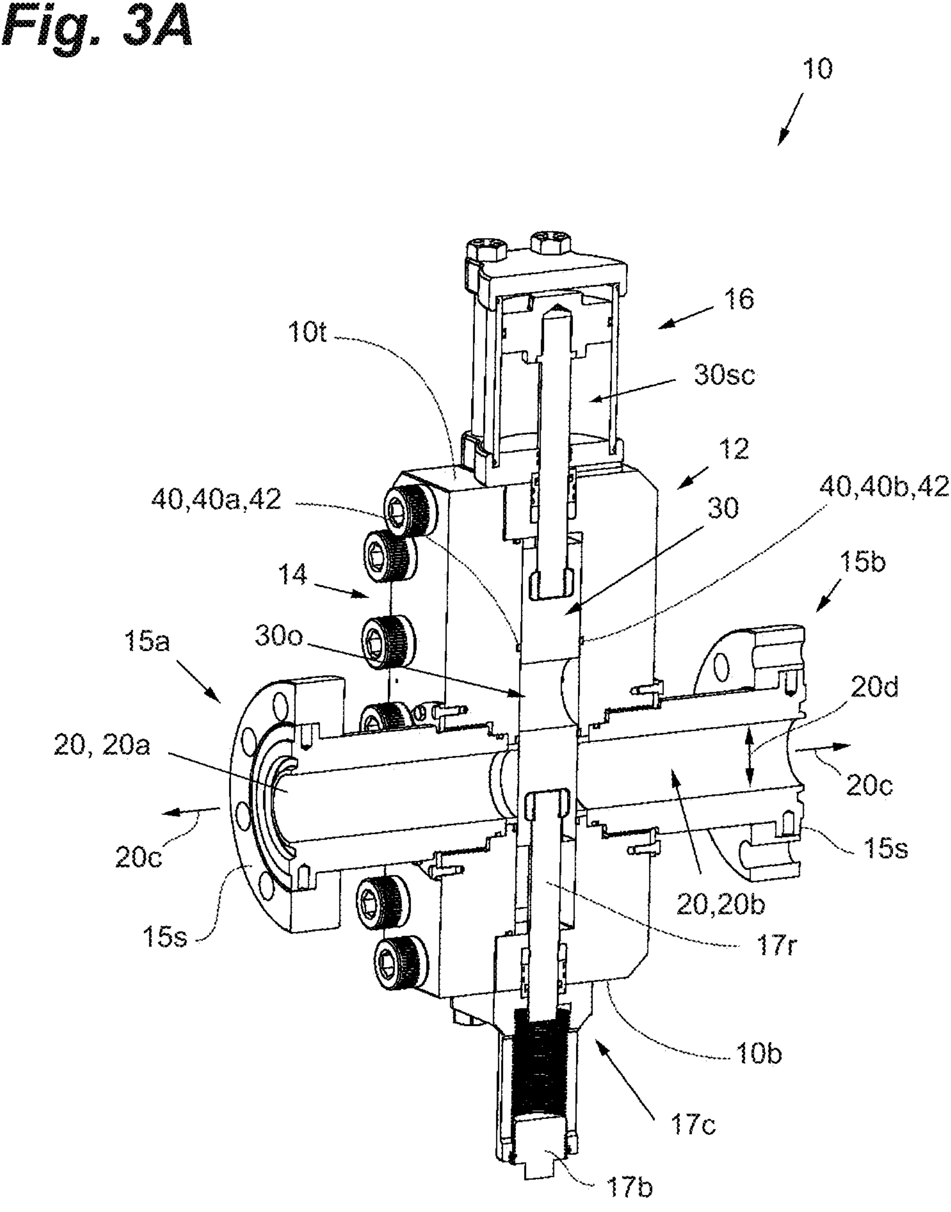
FIGS. 3A-3C are sectioned perspective views of the gate valve of the embodiment of FIG. 2A, in a closed, transition, and open configuration respectively.
Figure 3B:
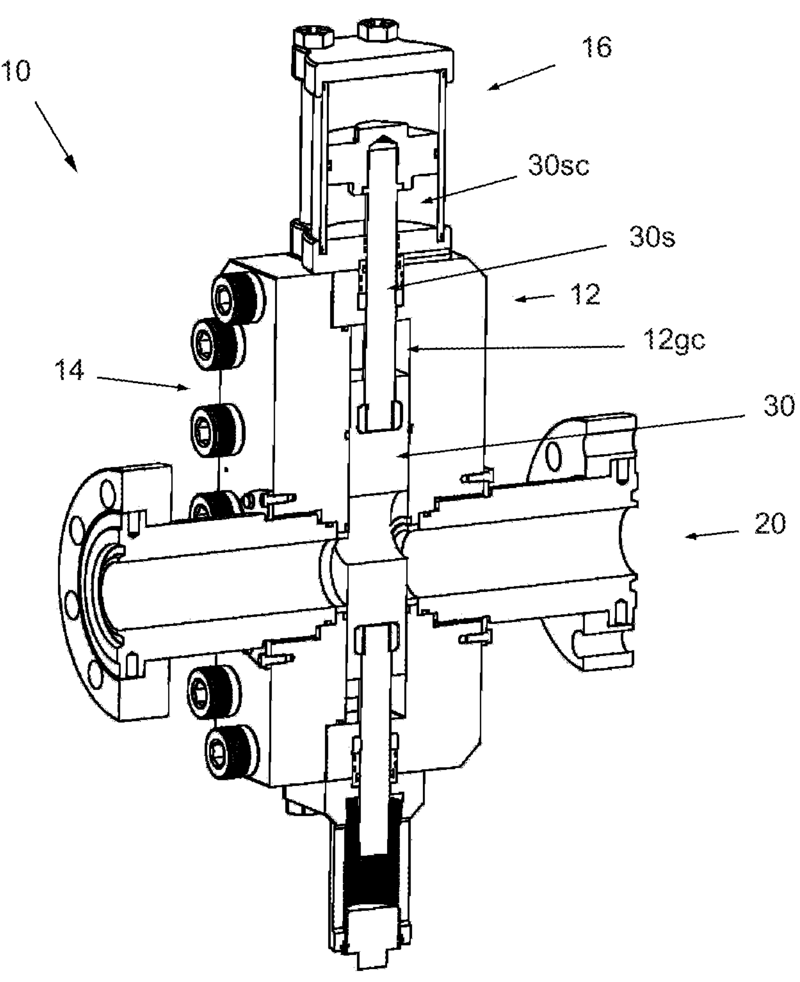
Figure 3C:
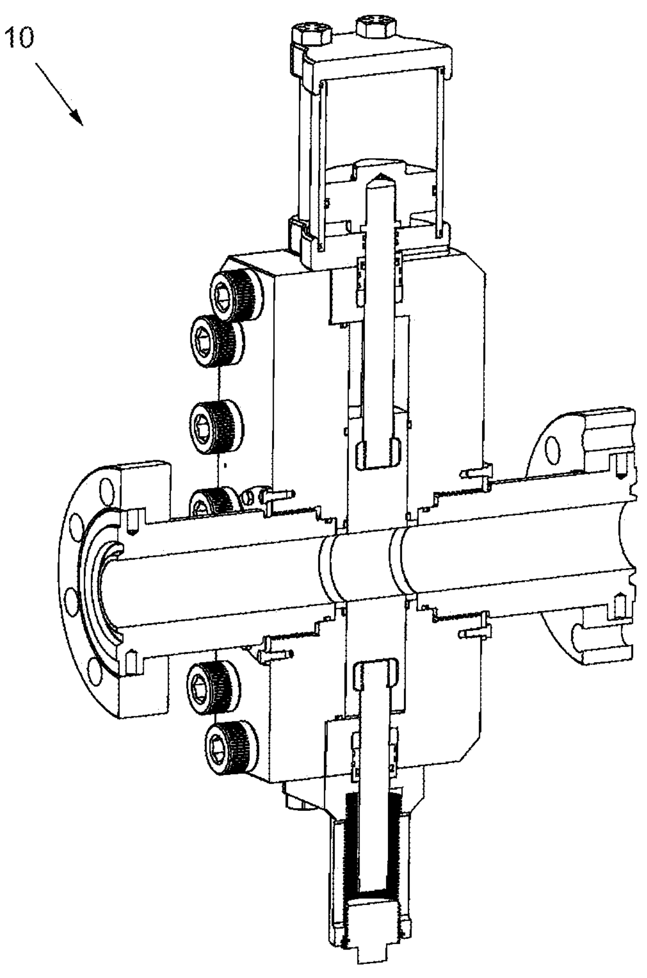
Figure 4A:
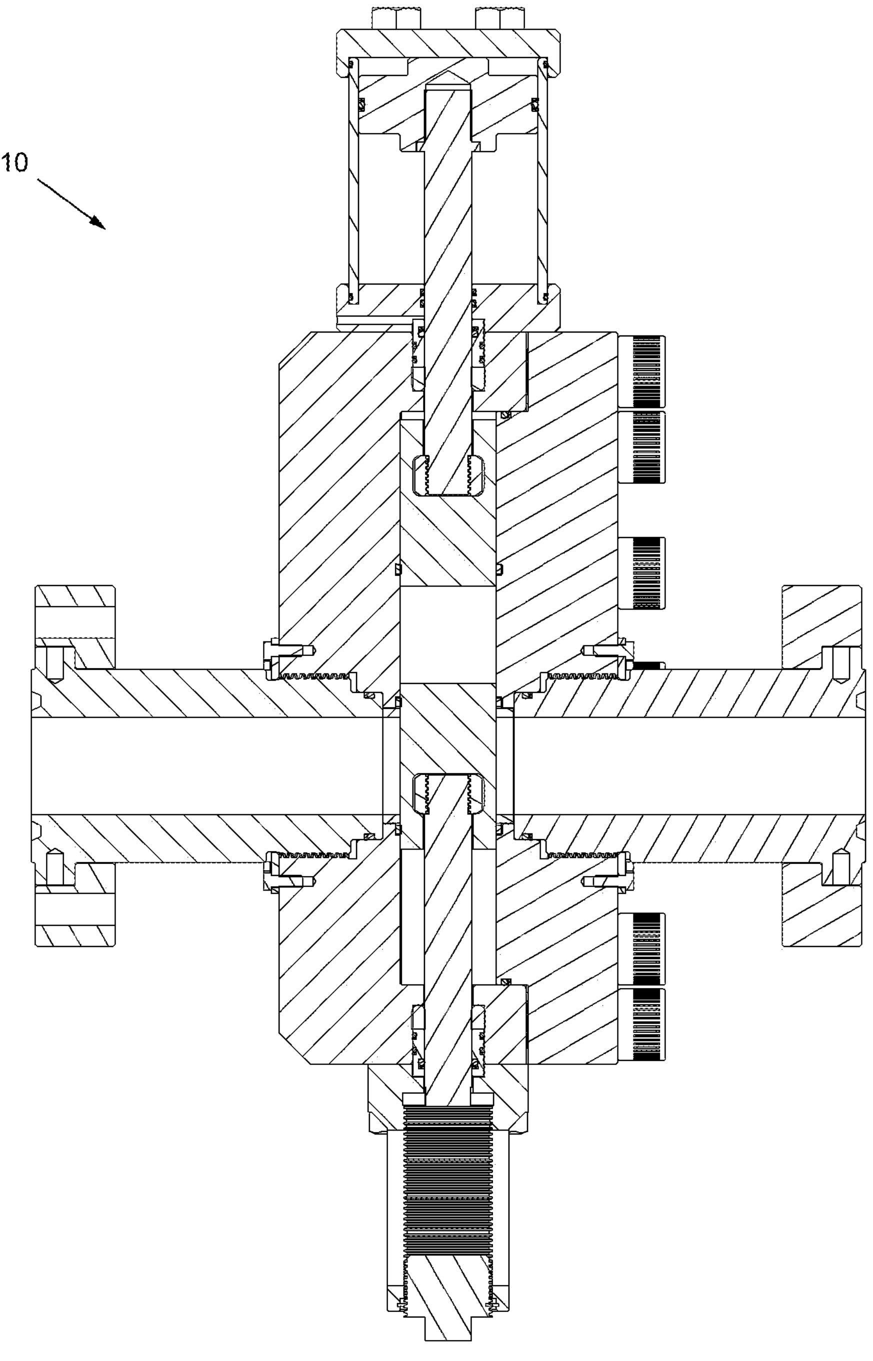
FIGS. 4A-4C are sectioned views of the gate valve of the embodiment of FIG. 2A, in a closed, transition, and open configuration respectively.
Figure 4B:
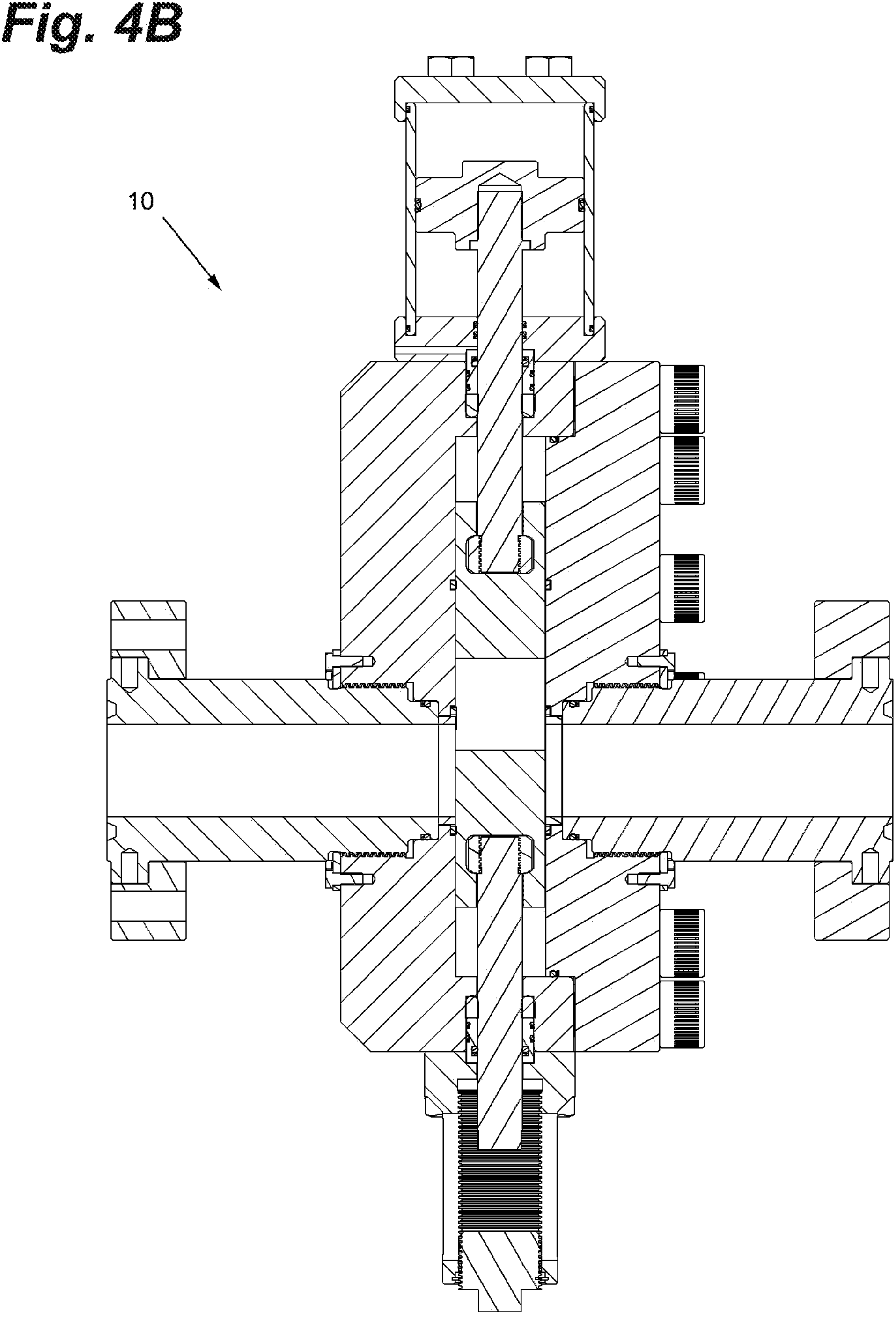
Figure 4C:
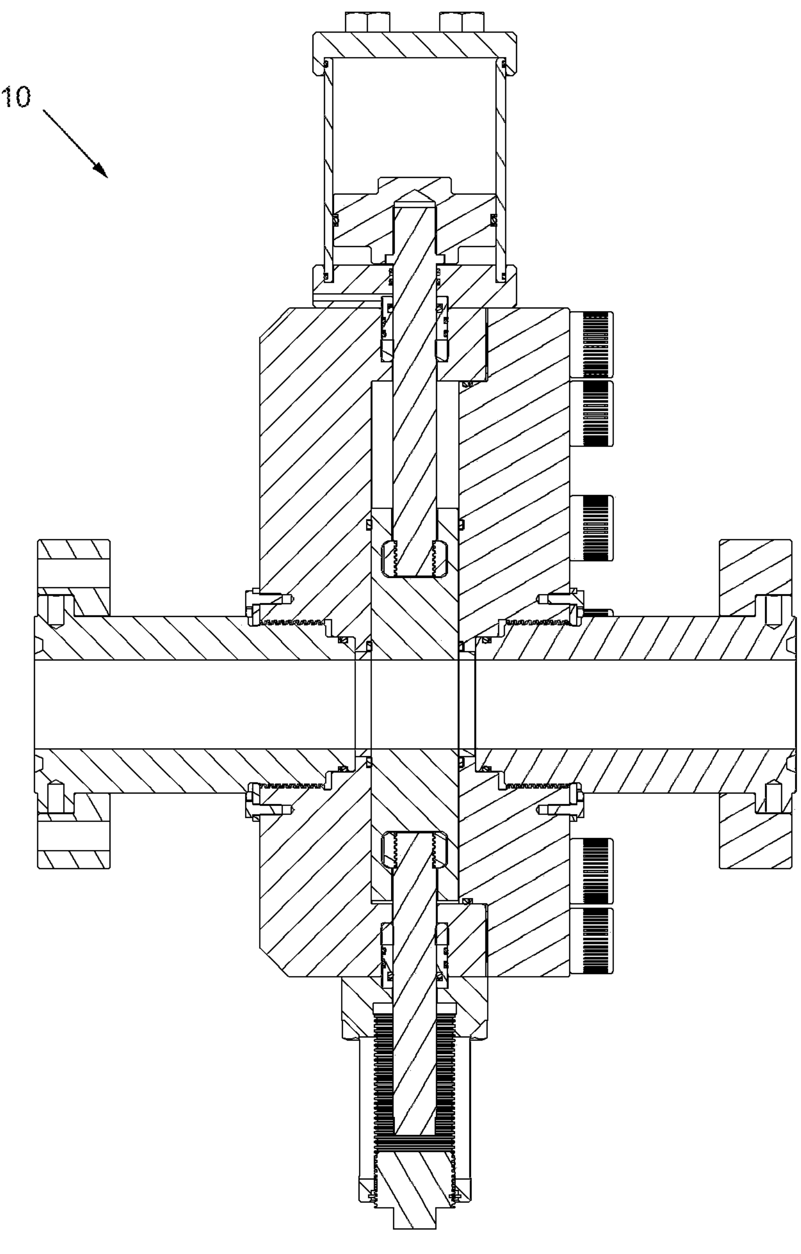

The gate valve 10 also contains a gate cavity or gate chamber 12*gc* about a gate cavity center-line 10*c*; see FIGS. 3B and 9C. Preferably, the gate cavity center-line 10*c* passes through the center of the gate 10 and through the top face 10*t* and bottom face 10*b*. More preferably, the gate cavity 12*gc* is a symmetric about the gate cavity center-line 10*c* and is an elongate, rectangular cuboid cavity disposed perpendicular to the flow passage 20 thereby permitting a gate 30 to travel or position within the valve 10 between a closed, transition, and open configuration; see FIG. 9C. In this preferred embodiment, gate cavity 12*gc* is exclusively within the valve main body 12, but in other embodiments (not shown), the gate cavity 12*gc* may be within both valve main body 12 and valve end cap 14.

Figures 15E, 15F:
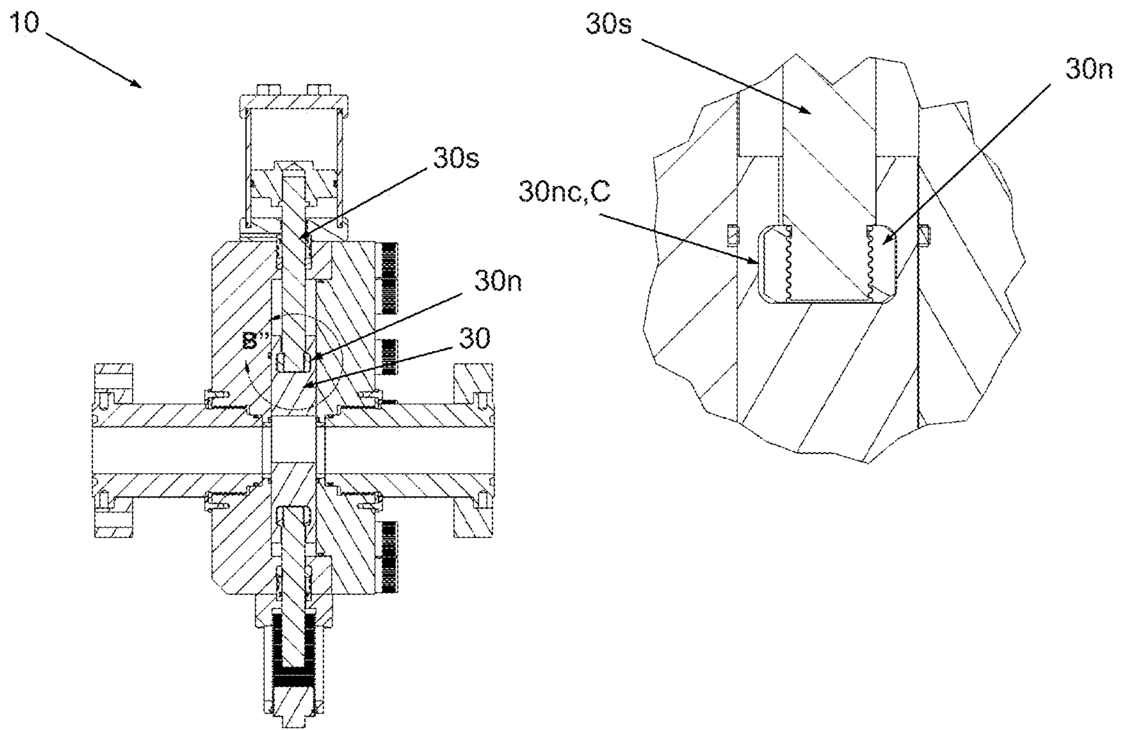
FIG. 15E is a sectioned view of the embodiment of FIG. 15A, now showing the stem nut offset to another end within the nut cavity.
FIG. 15F is an enlarged view of the area B' in FIG. 15C.

In a preferred embodiment, illustrated in FIGS. 15A-15F, the hydraulic actuation mechanism 16 is connected to the gate 30 in a conventional manner via a gate stem 30*s* that is preferably threaded into a stem nut 30*n* captured in a nut cavity 30*nc* at one end of the gate 30 (see FIGS. 15A-15F). More preferably, nut cavity 30*nc* is of such dimensions (i.e. somewhat larger than stem nut 30*n*) to provide some additional clearance about the stem nut 30*n*; as illustrated in FIG. 15B (stem nut 30*n* centered within nut cavity 30*nc*), 15D (stem nut 30*n* is offset to one end of the valve 10), and 15F (stem nut 30*n* is offset to the other end of the valve 10). In the preferred embodiment, the additional clearance C is 0.04" each direction. Advantageously, a gate 30 of slightly different thicknesses can now be accommodated within the valve 10 without having to adjust the positioning of the gate stem 30*s* relative to the gate cavity center-line 10*c*. More advantageously, a gate 30 used within the valve 10 may now be coated with a thicker coating (e.g. a tungsten coating) than previously possible in prior art gate valves (e.g. preferably a coating of 30/1000's of an inch versus a conventional coating of 4/1000's of an inch) and, when such gate 30 is subsequently shaved or machined (to remove grooves and imperfections that may have accumulated on the faces of the gate 30), the refurbished gate 30 can still be used within the valve 10, even though it is thinner than before and would otherwise be offset within the gate chamber 12*gc*, were it not for the clearance C.

Valve end cap 14 further comprises a first mating face 14*f* preferably oriented along a plane 10*p* that is substantially parallel to the gate cavity center-line 10*c* and perpendicular to the bore center-line 20*c*; see FIG. 9C. Similarly, valve main body 12 further comprises a second mating face 12*f* preferably oriented also along a plane 10*p* that is substantially parallel to the gate cavity center-line 10*c* and perpendicular to the bore center-line 20*c*; see FIG. 9C.

First and second mating faces 12*f*, 14*f* of the valve main body 12 and valve end cap 14 are of such dimensions to enable valve main body 12 and valve end cap 14 to removably, sealably mate or assemble together to form the gate cavity 12*gc*, to house the gate 30 so that the gate 30 can travel therewithin between the closed, transition, and open configurations, and to maintain a sufficient pressure seal and pressure rating within the gate cavity 12*gc* to keep any fluids that may be within the gate valve 10 contained in a desired manner, e.g. depending on operational pressure requirements. Advantageously, by having valve main body 12 and valve end cap 14 removably, sealably mate or assemble together to form the gate cavity 12*gc*, the gate cavity 12 *gc* can be easily machined or milled out from valve main body 12 during manufacturing.

Figure 10A:
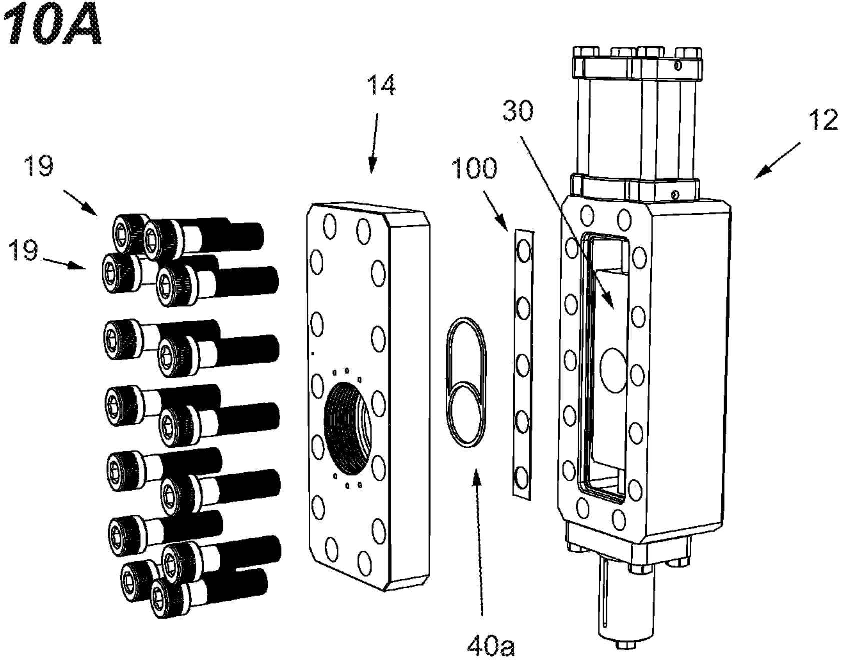
FIGS. 10A-10B are exploded perspective views of certain components of the gate valve of the embodiment of FIG. 2A.
Figure 10B:
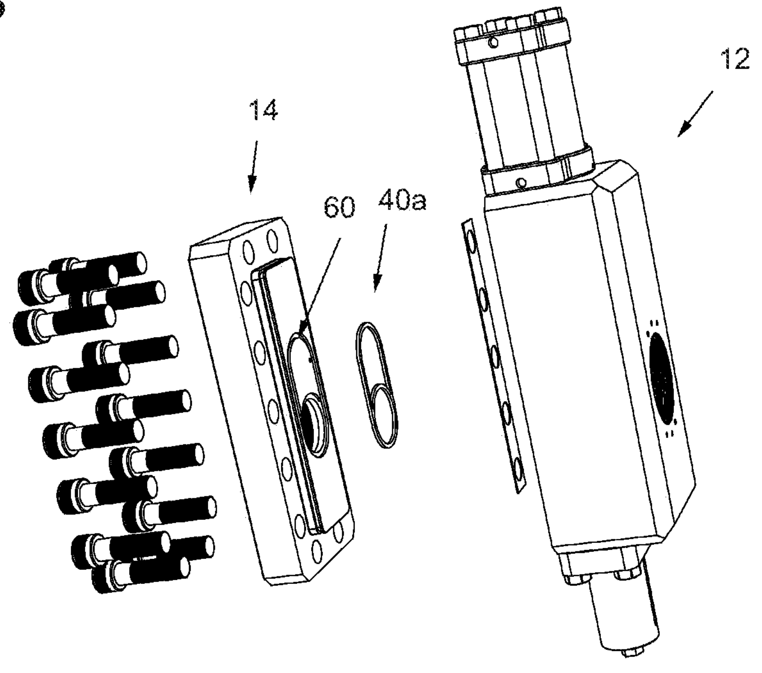

As a non-limiting example, the valve end cap 14 is attached to the main valve body 12 by way of a fastening device such as, but not limited to cap bolts 19; see FIGS. 10A-10B. In the present embodiment, the cap bolts 19 threadably engage in the second mating face 12*f* via the valve end cap 14. Other fasteners such as, but not limited to, bolts traversing thru-holes in both the valve end cap 14 and the main valve body 12 and secured with a nut, can be used as understood by one of skill in the art. In another embodiment (not show) a seal such as a metal gasket may be provided between the first and second mating faces 12*f*, 14*f* to restrict fluid leakage from the gate valve 100.

A preferred embodiment of the gate valve 10 preferably further comprises a pair of seats, gate seals or flow passage seals 40, which may be referred to as a first seal 40*a* and a second seal 40*b* positioned on either side of the gate 30 (see FIGS. 5A, 5B, 9A, 9B, 9C, 11A and 11B). The first and second seals 40*a*, 40*b* of this embodiment each feature a shape or seal profile 40*p* that is a first profile 41 combined or overlapped with a second profile 42. The first profile 41 is a circular profile (when viewed from the front or rear) comprised only of two semicircular members, namely an inner semicircular member 43*a* and an outer semicircular member 43*b*.

Figures 11A, 11B:
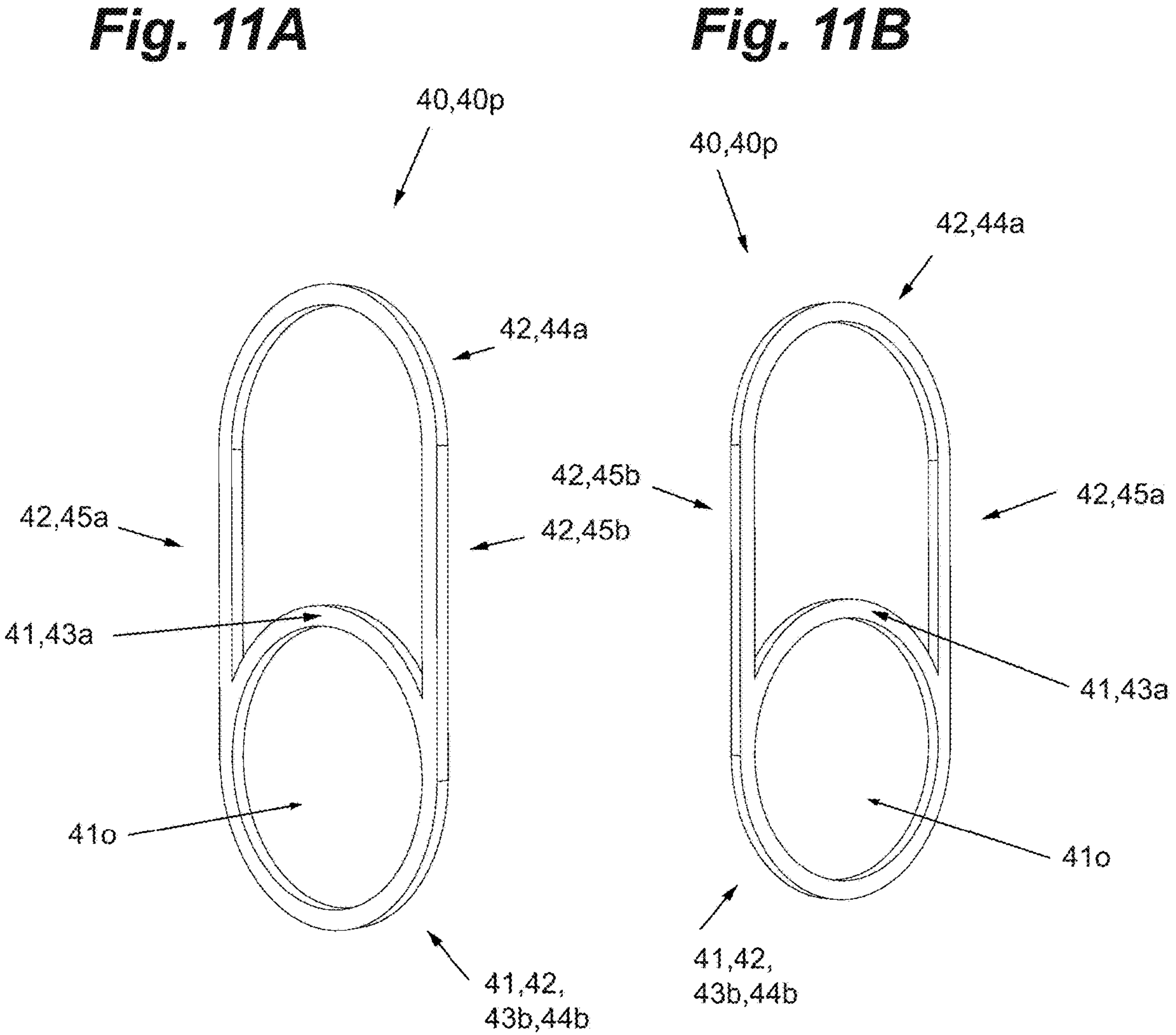
FIGS. 11A-11B are front and rear perspective views of the flow passage or gate seals of the embodiment of FIG. 9A.
Figure 11C:
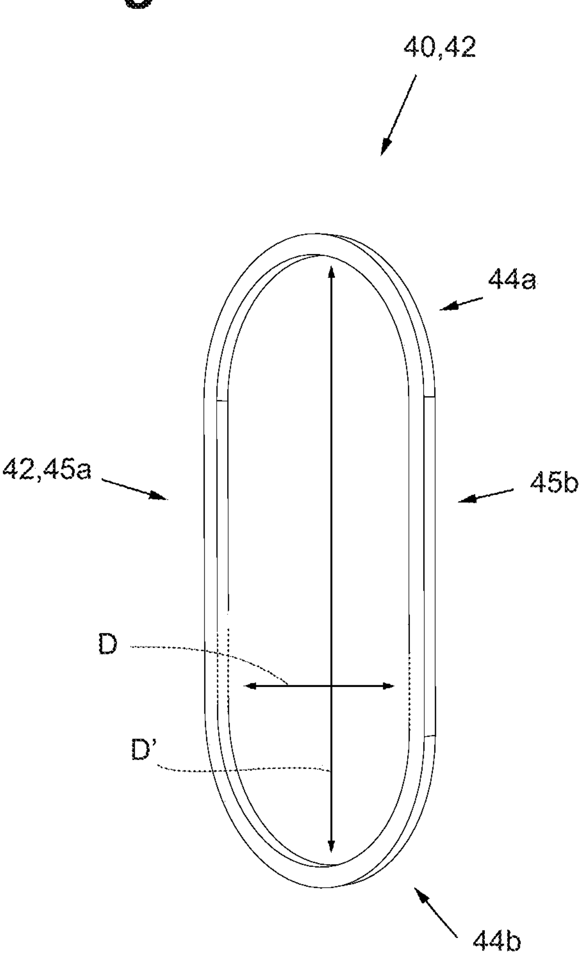
FIG. 11C is a front perspective view of a portion of the flow passage seal of the embodiment of FIG. 9A, illustrating only the stadium profile portion.

The second profile 42 is a stadium profile (when viewed from the front or rear; see FIG. 11C). The second, stadium profile 42 of the seals 40 comprises a geometric shape constructed of two semicircular members, namely a first semicircular member 44*a* and a second semicircular member 44*b* positioned at opposite ends with a pair of straight legs 45*a*, 45*b* therebetween. The two profiles 41, 42 combine to comprise the seal profile 40*p* by virtue of the fact that the outermost semicircular member 43*b* is the same member as the second semicircular member 44*b*; see FIGS. 11A-11B.

Preferably, the seals 40 are of a material of sufficient rigidity so that, during actuation of the gate valve 10, no portion of the seal (e.g. inner semicircular member 43*a*) is pushed or deformed into gate bore or gate opening 300 when under pressure. Materials such as Teflon™, alloy steel, tungsten carbide coated steel, Nylatron™ polymer, Derlin™ polymer, Polytetrafluoroethylene (PFTE) filed Derlin™ polymer, virgin PTFE, carbon filed PTFE, and glass filled PTFE may all be used and their choice for a particular application and pressure rating will be understood by one of skill in the art.

Figure 12A:
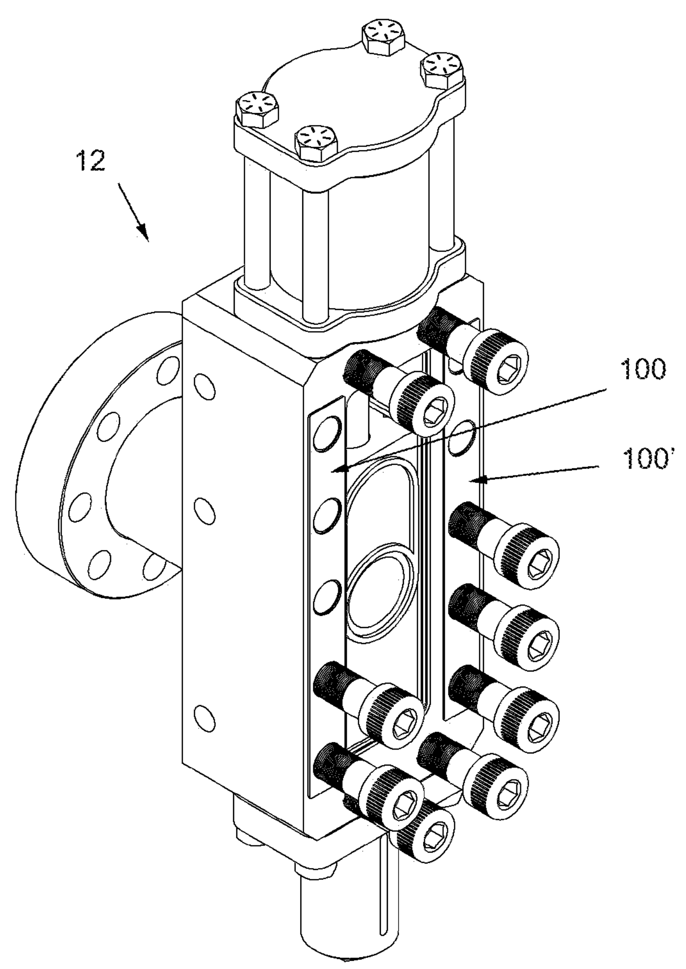
FIG. 12A is a perspective views of certain components of the gate valve of the embodiment of FIG. 2A, illustrating placement of shims against the gate valve body.
Figures 12B, 12C:
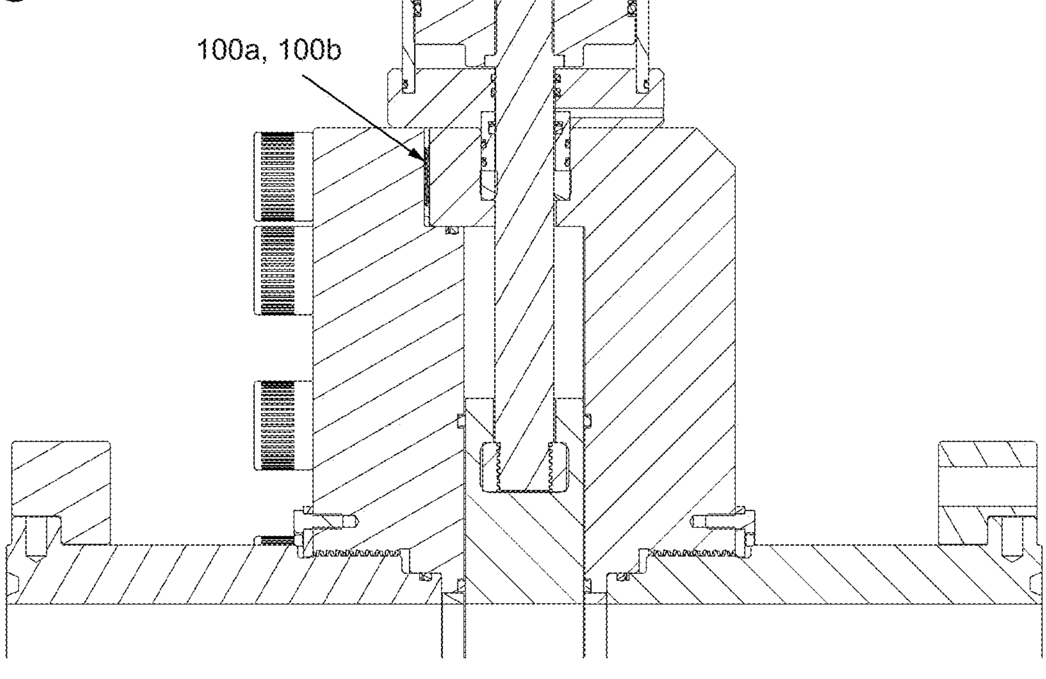
FIG. 12B is a sectioned view of the gate valve of the embodiment of FIG. 2A, illustrating placement of multiple layers of shims between the gate valve body and gate valve cap.
FIG. 12C is an enlargement of the area B in FIG. 12B.
Figure 12D:
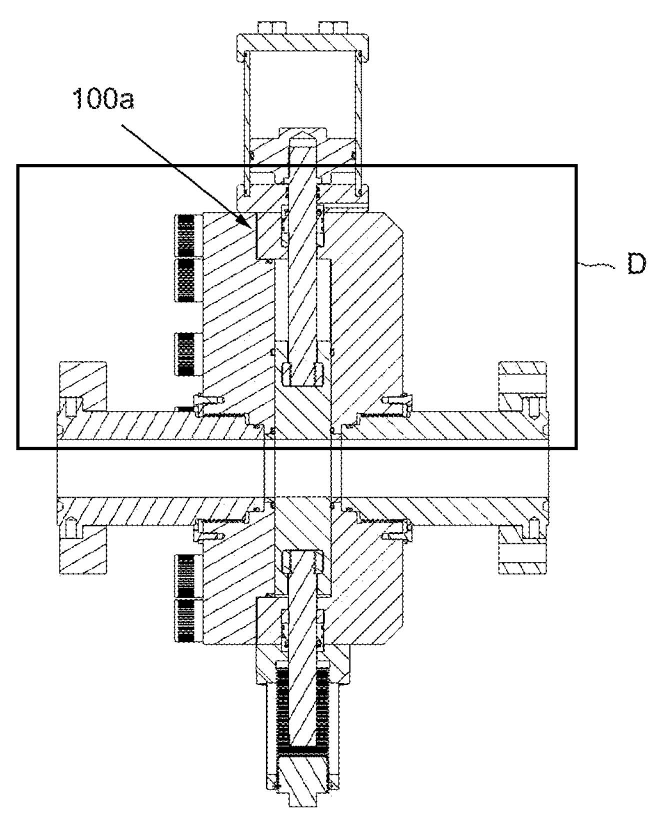
FIG. 12D is a sectioned view of the gate valve of the embodiment of FIG. 2A, illustrating placement of a single layer of shims between the gate valve body and gate valve cap.
Figure 12E:
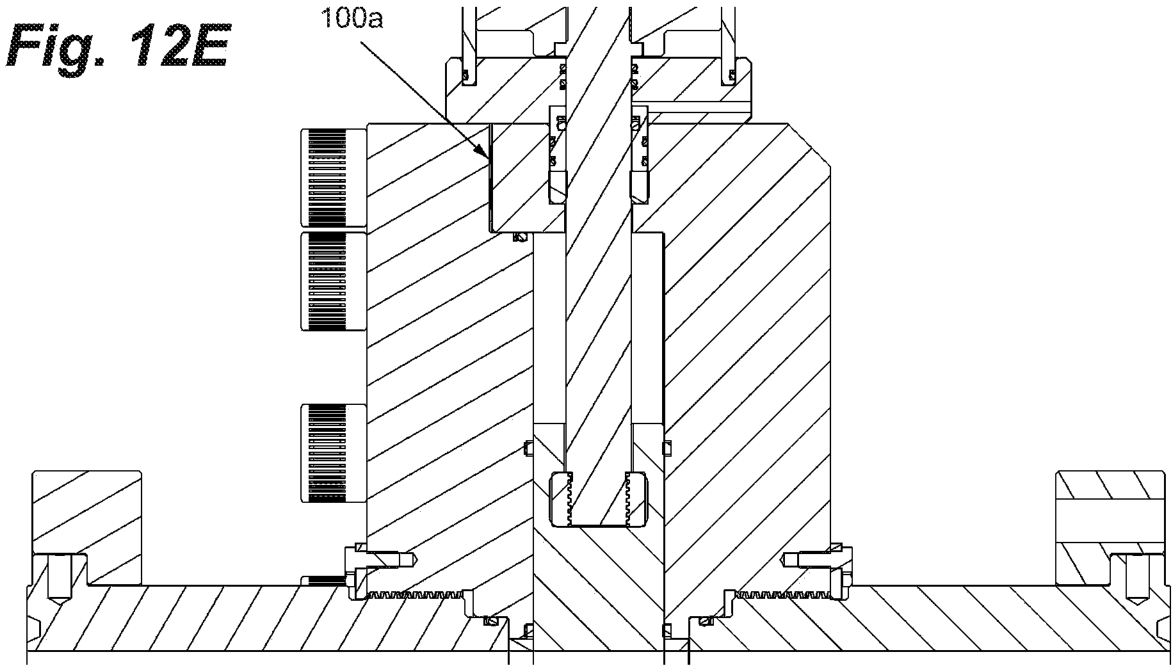
FIG. 12E is an enlargement of the area D in FIG. 12D.

In a preferred embodiment shown in FIGS. 12A-12E, gate valve 10 further comprises a plurality of shims 100 positionable between the first and second mating faces 12*f*, 14*f* of the valve main body 12 and valve end cap 14. Shims 100 may be of similar metal material as the metal gasket (not shown) between the first and second mating faces 12*f*, 14*f* and function to allow an operator or owner of the gate valve 10 to control any gap between first seal 40*a* and the first gate cavity face 14*gf* of valve end cap 14 very precisely; i.e. the cap 14 can be shimmed to adjust tolerances and "squish" on the first seal 40*a* (and by force passing through the gate 30, also on the second seal 40*b*) when cap 14 is mated to body 12 via bolts 19. Shims may be provided as a paired set 100,

100' (see FIG. 12A). FIGS. 12B-12C illustrated two sets of shims 100*a*, 100*b*, providing for less of a "squish" on seals 40*a*, 40*b* as compared to that shown in FIGS. 12D-12E, where there is only a single set of shims 100*a*.

The gate 30 comprises a gate bore or gate opening 300 offset substantially disposed in an end of the gate 30. A gate bore diameter 30*d* is preselected such that the gate bore 300 will not impede the free flow of fluid in the gate valve 10 when the gate 30 is in the open configuration, wherein the gate bore 300 is substantially in alignment with the flow passage 20. Typically, the gate bore diameter 30*d* is designed to be substantially the same as the flow passage diameter 20*d*. The gate valve 10 can also be positioned to a closed configuration when the gate bore 300 is moved into a position relative to the flow passage 20 such that the flow of fluid through the gate valve 100 is substantially reduced or eliminated. This closed configuration is accomplished by causing the gate 30 to move an appropriate amount within the gate cavity 12*gc* in a direction perpendicular (or substantially perpendicular) to direction of the flow passage 20 so that when the gate 30 is in contact with the first and second seals 40*a*, 40*b*, it intersects the flow passage 20 and substantially reduces or eliminates the flow of fluid between the first and second flanges 15*a*, 15*b*.

Figure 5A:
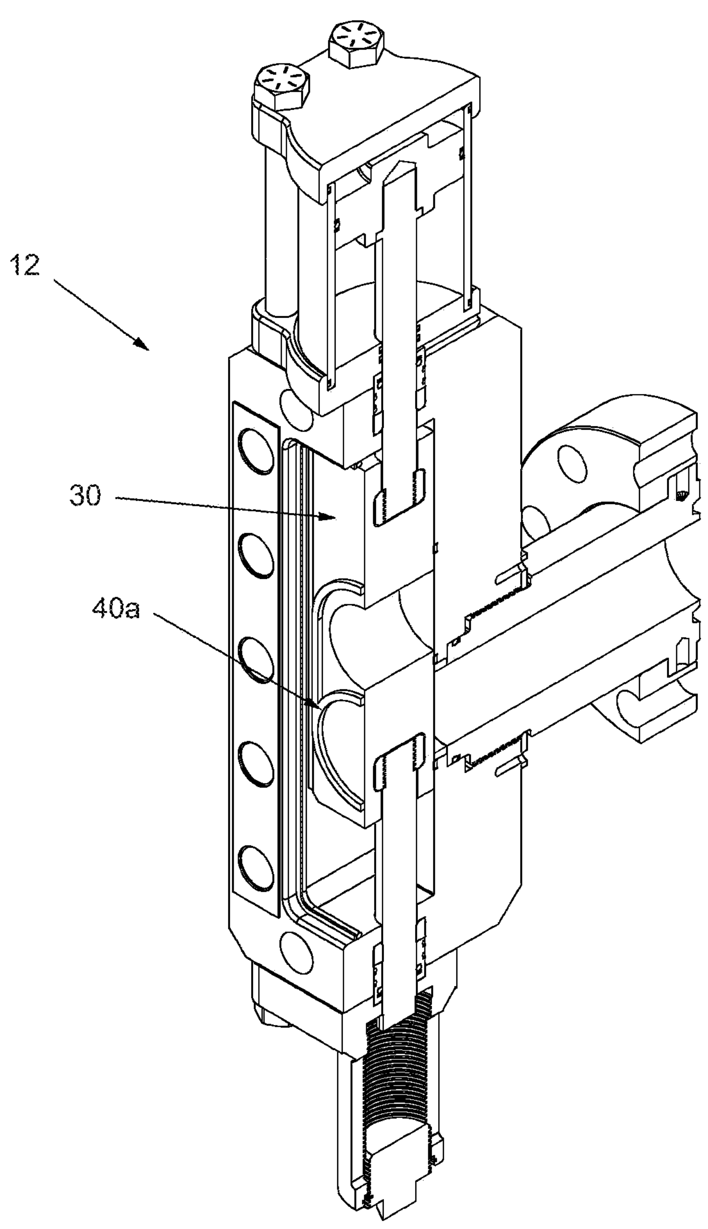
FIGS. 5A-5C are sectioned perspective views of certain components of the gate valve of the embodiment of FIG. 2A, in a closed, transition, and open configuration respectively.
Figure 5B:
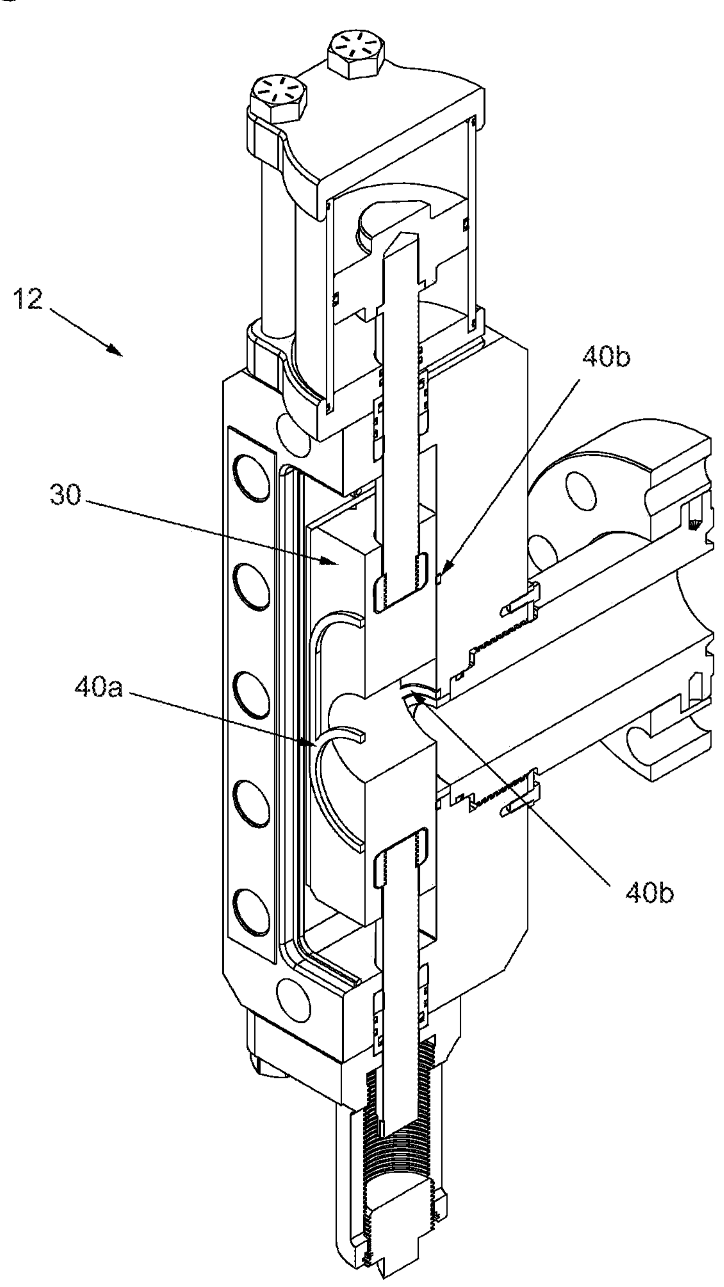
Figure 5C:
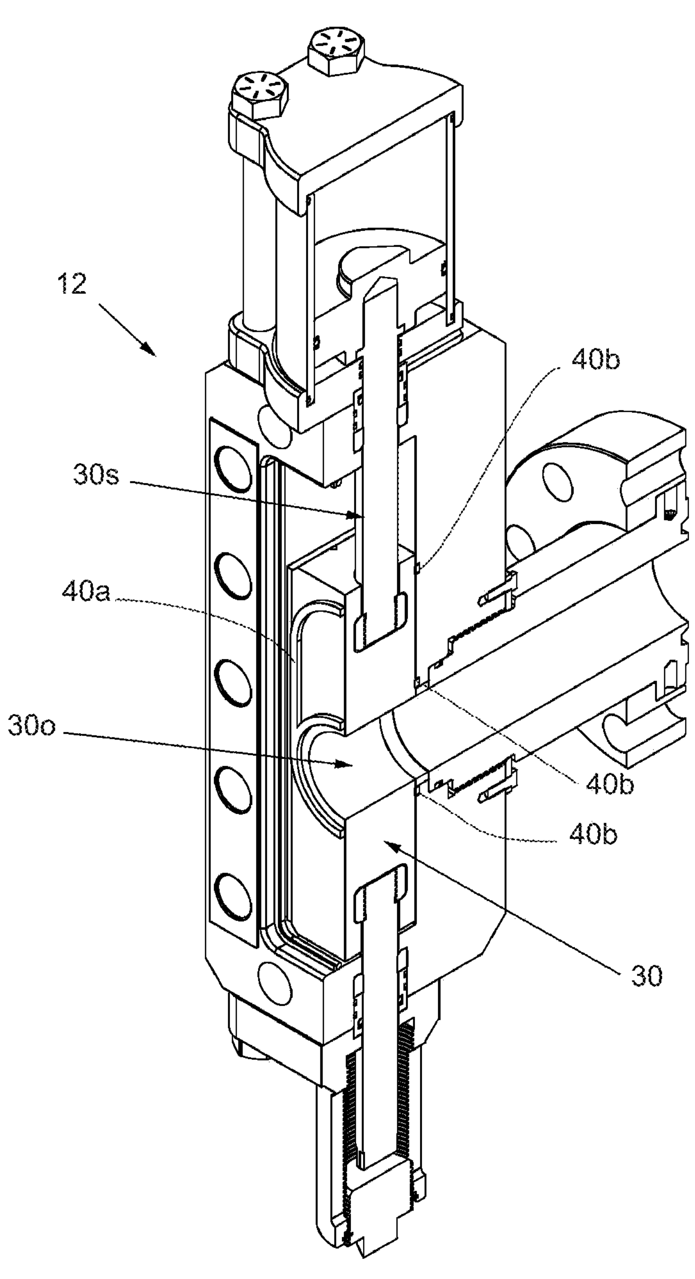
Figure 5D:
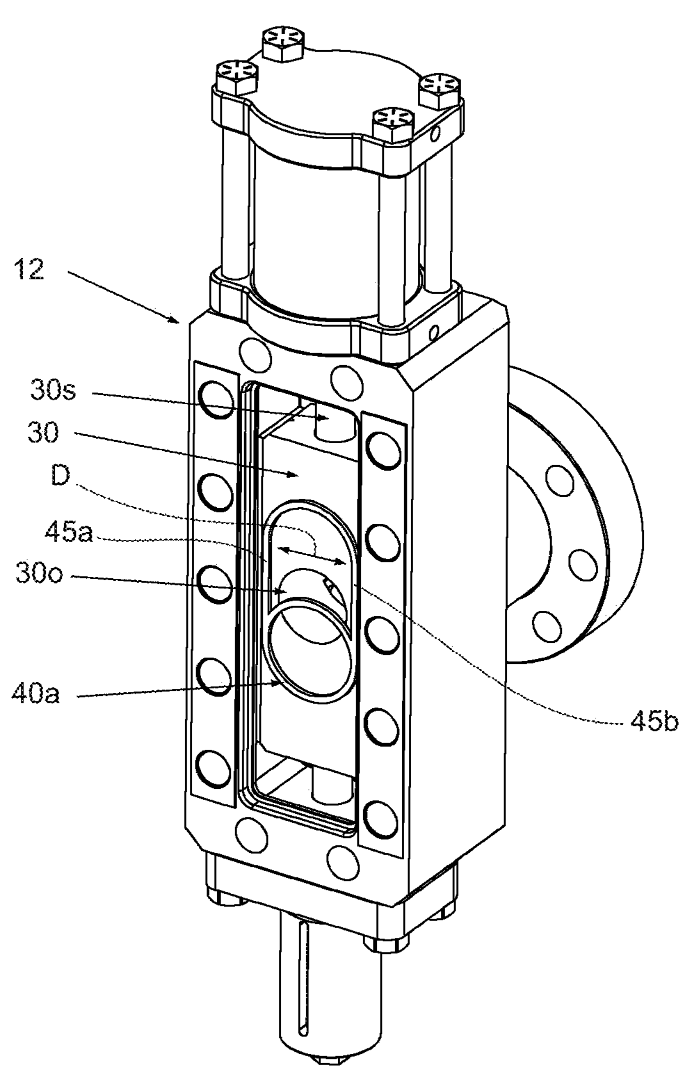
FIGS. 5D-5E are perspective views of certain components of the gate valve of the embodiment of FIG. 2A, in a transition, configuration.
Figure 5E:
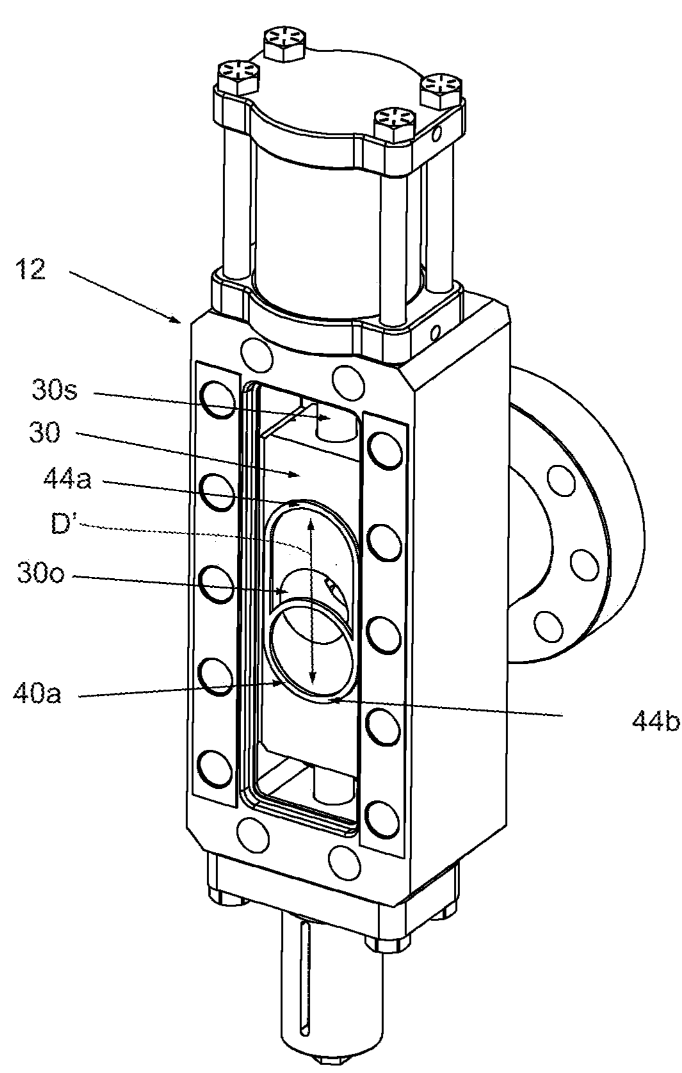
Figure 6A:
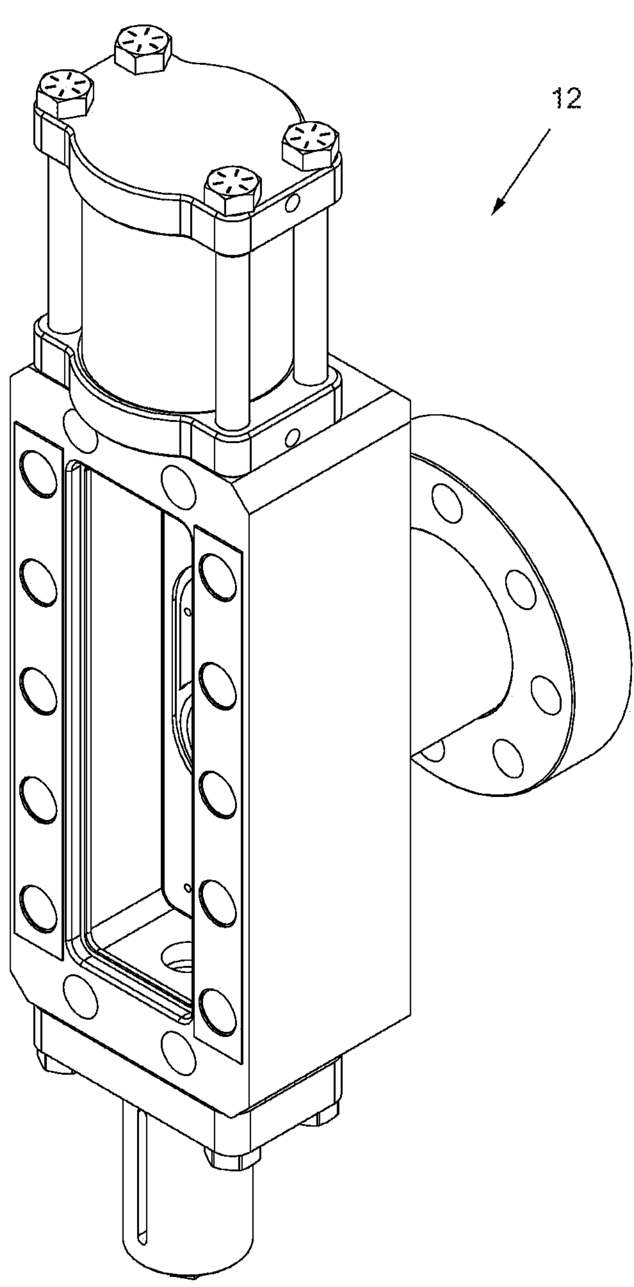
FIGS. 6A-6B are perspective views of certain components of the gate valve of the embodiment of FIG. 2A.
Figure 6B:
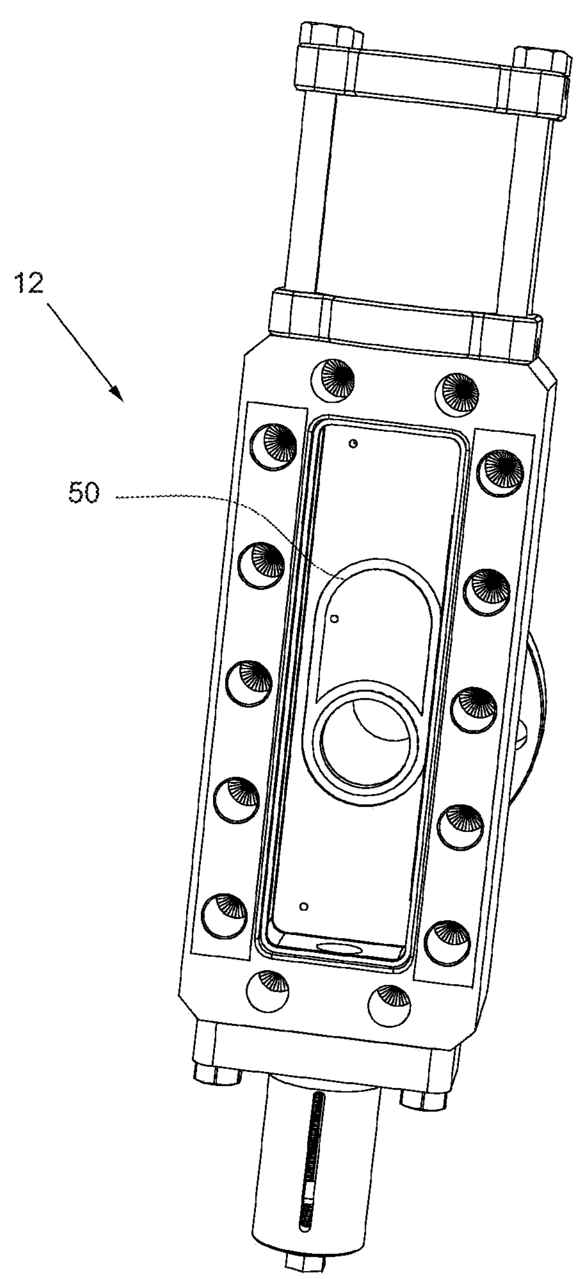
Figure 6C:
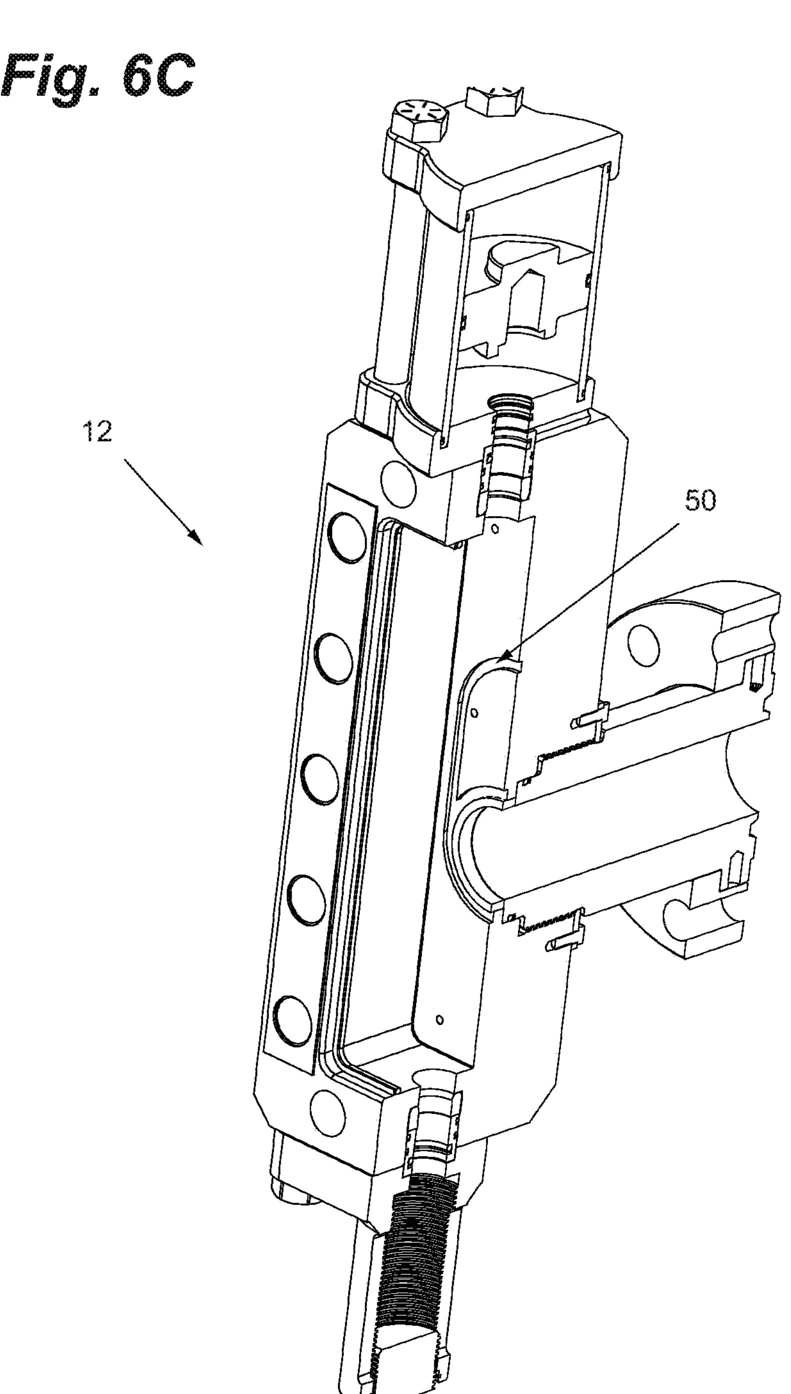
FIG. 6C is a sectioned perspective view of certain components of the gate valve of the embodiment of FIG. 2A.

The straight legs 45*a*, 45*b* of the second profile of the seals 40, 40*a*, 40*b* are of such dimensions and length to ensure that the gate bore 300 is kept within the interior of the second profile 42 regardless of what configuration or position the gate 30 may be in during operation of the gate valve 10; i.e. even when the gate 30 is in the closed configuration, and the gate bore 300 is moved into a position relative to the flow passage 20 such that the flow of fluid through the gate valve 100 is substantially reduced or eliminated, the gate bore 300 is still within the inside or interior of the second profile 42 of the first and second seals 40*a*, 40*b*; see FIG. 3A. Preferably, and as shown in FIG. 5D, the outside diameter of the gate opening 300 is smaller than the distance D between the two straight legs 45*a*, 45*b*. More preferably, as the gate opening 300 reciprocates between the open and closed configurations, it is maintained within the spacing or distance D' between the first and second semicircular members 44*a*, 44*b* (see FIG. 5E, illustrating the gate opening 300 as at the transition configuration).

Advantageously, second profile 42 prevents solids and debris from moving past the gate 30 and collect above the gate 30 and around the stem 30*s*. Any solids that may be within the fluid passing through the gate 10 will remain trapped within the gate's bore or opening 300, regardless of position of the gate 30 within the gate chamber 12*gc*; such solids then simply being flushed out of the gate opening 300 the next time the gate is in the open configuration. Even more advantageously, there is no longer any need (or a significantly reduced need) to flush out the stem chamber 30*sc*, and the gate valve 10 of the present invention can be oriented so that the flow passage 20 is vertical.

Referring to FIG. 9C, valve end cap 14 preferably comprises a first gate cavity face 14*gf* oriented along a plane 10*p* that is substantially parallel to the gate cavity center-line 10*c* and perpendicular to the bore center-line 20*c*. When the body 12 and cap 14 are assembled or mated together, the first gate cavity face 14*gf* then preferably forms a first side 13*a* of the gate cavity 12*gc* positioned radially outward from the gate cavity center-line 10*c* towards the first end 11*a* and adjacent the first flange 15*a*; see FIG. 9C.

More preferably, valve main body 12 further comprises a second gate cavity face 12*gf* oriented along a plane 10*p* that is also substantially parallel to the gate cavity center-line 10*c* and perpendicular to the bore center-line 20*c*. The second gate cavity face 12*gf* then preferably forms a second side 13*b* of the gate cavity 12*gc* positioned radially outward from the gate cavity center-line 10*c* towards the second end 11*b* and adjacent the second flange 15*b*; see FIG. 9C. The valve end cap 14 may further comprise a cap ledge 141 that projects from the first mating face 14*f* towards the second gate cavity face 12*gf*, and is of such dimensions and tolerances to removably, sealably fit within the valve main body 12 to provide a pressure fit between the body 12 and cap 12; as more clearly shown in the figures. Conventional seals S are preferably provided on either or both of the body 14 and cap 12 to ensure that, once mated, the body 12 and cap 14 can maintain a sufficient pressure seal and pressure rating within the gate cavity 12*gc*. For example, a seal groove 14*g* may be provided on the periphery of the cap ledge 141 to hold a seat or seal S; see FIG. 9C, which then seals against the interior surface of the gate cavity 12*gc*.

The valve main body 12 further comprises a body seal groove or pocket 50 on the second gate cavity face 12*gf*. Body seal groove 50 has a shape or profile that is a first profile 51 combined or overlapped with a second profile 52, and of such dimensions to accept a seal 40 disposed therewithin (e.g. a second seal 40*b*). Preferably, the first profile 51 is a circular profile (when viewed from the front or rear) comprised only of two semicircular grooves, namely an inner semicircular groove 53*a* and an outer semicircular groove 53*b* and is symmetric about the bore center-line 20*c*.

Figures 7A, 7B, 7C:
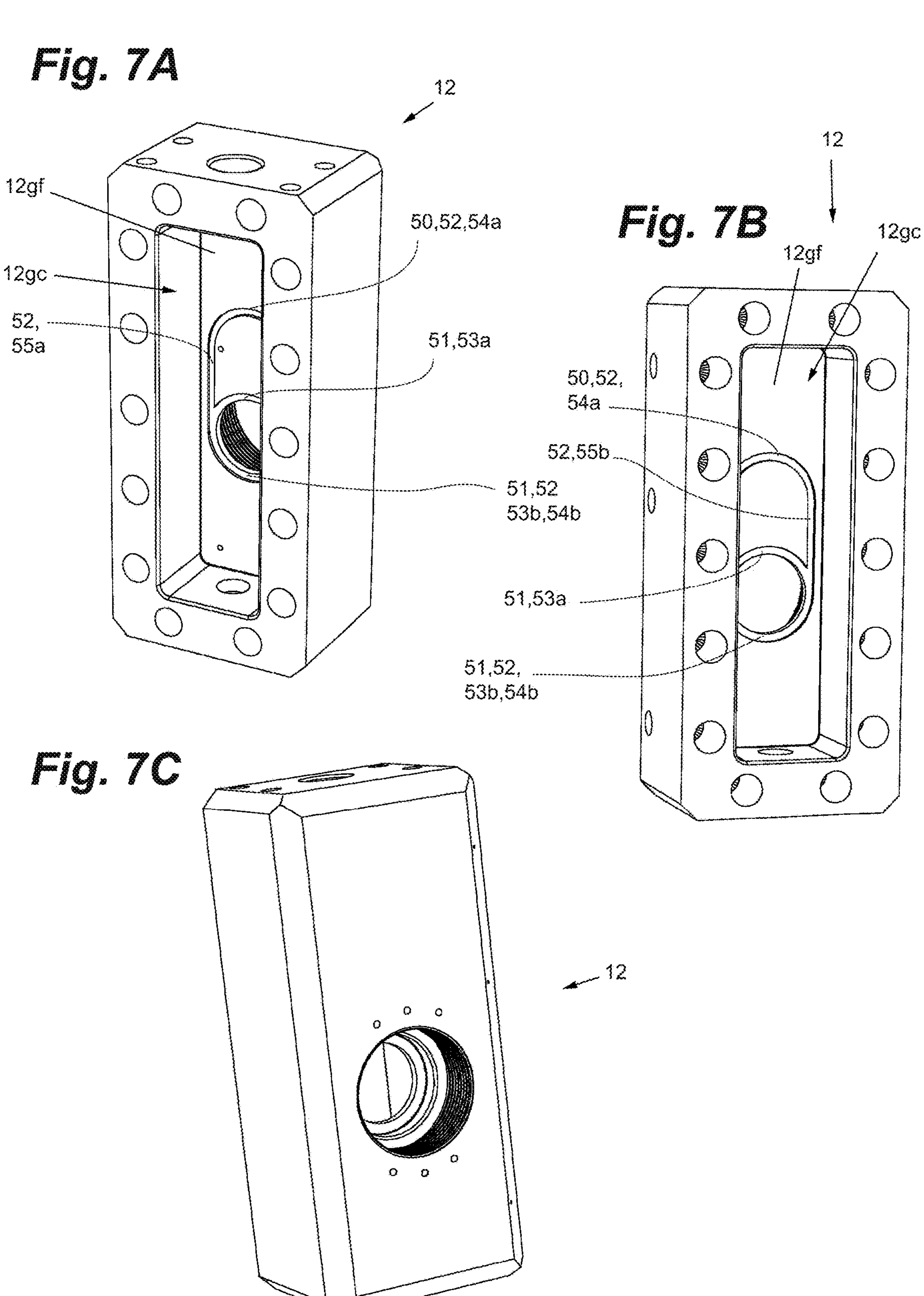
FIGS. 7A-7C are perspective views of a preferred embodiment of a gate valve body.

The second profile 52 is a stadium profile (when viewed from the front or rear). The second, stadium profile 52 of the seal pocket 50 comprises a geometric shape constructed of two semicircular grooves, namely a first semicircular groove 54*a* and a second semicircular grooves 54*b* positioned at opposite ends with a pair of straight grooves 55*a*, 55*b* therebetween. The two profiles 51, 52 are combined by virtue of the fact that the outermost semicircular groove 53*b* is the same groove as the second semicircular groove 54*b*; see FIGS. 7A-7B.

The valve end cap 14 further comprises a cap seal groove or pocket 60 on the first gate cavity face 14*gf*. Cap seal groove 60 has shape or profile that is a first profile 61 combined or overlapped with a second profile 62, and of such dimensions to accept a seal 40 disposed therewithin (e.g. a second seal 40*a*). Preferably, the first profile 61 is a circular profile (when viewed from the front or rear) comprised only of two semicircular grooves, namely an inner semicircular groove 63*a* and an outer semicircular groove 63*b* and is symmetric about the bore center-line 20*c*.

Figure 8A:
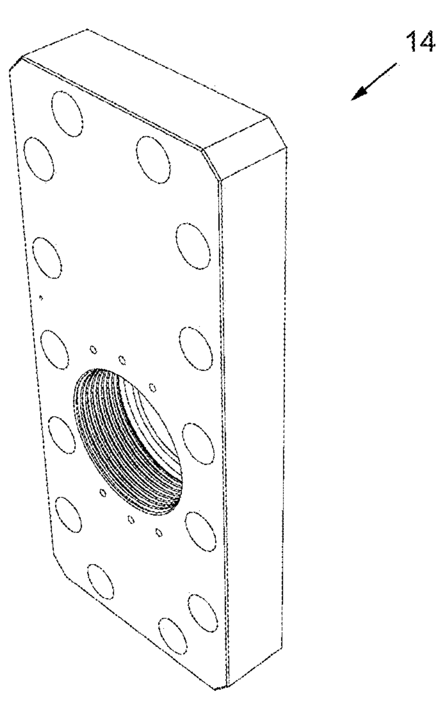
FIGS. 8A-8C are perspective views of a preferred embodiment of a gate valve cap.
Figure 8B:
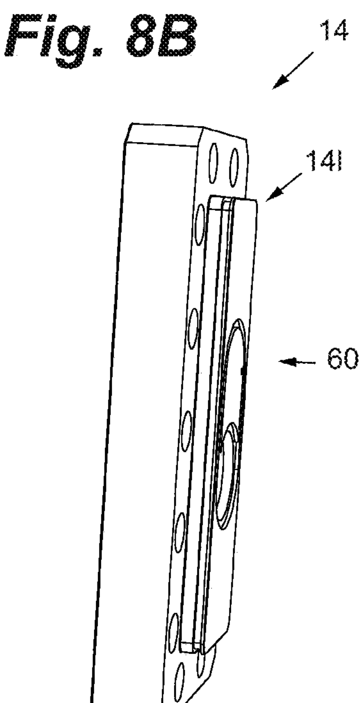
Figure 8C:
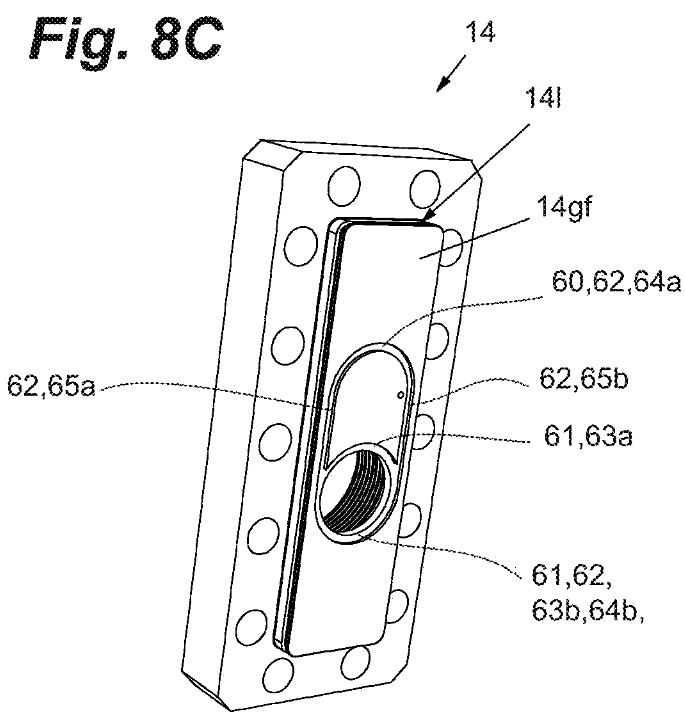

The second profile 62 is a stadium profile (when viewed from the front or rear). The second, stadium profile 62 of the seal pocket 60 comprises a geometric shape constructed of two semicircular grooves, namely a first semicircular groove 64*a* and a second semicircular groove 64*b* positioned at opposite ends with a pair of straight grooves 65*a*, 65*b* therebetween. The two profiles 61, 62 are combined by virtue of the fact that the outermost semicircular groove 63*b* is the same groove as the second semicircular groove 64*b*; see FIG. 8C.

Advantageously, by having valve main body 12 and valve end cap 14 removably, sealably mate or assemble together to form the gate cavity 12*gc*, and by having the first and second gate cavity faces (14*gf*, 12*gf*) oriented substantially along plane 10*p*, the body seal groove 50 can be easily machined or milled out of the second gate cavity face 12*gf* during manufacturing, and the cap seal groove 60 can likewise be easily machined or milled out of the first gate cavity face 14*gf* during manufacturing.

Preferably, the first profile 41 of the first seal 40*a* further has an inner diameter 41*i* such that the opening 410 in the seal 40*a* is substantially commensurate with the flow passage 20 and the gate opening 300. A seal thickness is chosen so that the gate 30 engages with the seal 40*a* rather than the first gate cavity face 14*gf* but wherein the seal 40*a* is substantially disposed within the pocket 60. The dimensions and materials of the seal 40*a* are determined based on the working pressure and the contact or bearing stress. One of skill in the art will be able to readily adapt such dimensions and materials accordingly.

More preferably, the first profile 41 of the second seal 40*b* further has an inner diameter 41*i* such that the opening 410 in the seal 40*b* is substantially commensurate with the flow passage 20 and the gate opening 300. A seal thickness is chosen so that the gate 30 engages with the seal 40*b* rather than the second gate cavity face 12*gf* but wherein the seal 40*a* is substantially disposed within the pocket 50. The dimensions and materials of the seal 40*b* are determined based on the working pressure and the contact or bearing stress. One of skill in the art will be able to readily adapt such dimensions and materials accordingly.

ADDITIONAL EMBODIMENTS

In another embodiment of the gate valve 10, and referring to FIGS. 13A-13F, the gate valve 10 is similar to the embodiment of FIGS. 2A-12E except that the pair of gate seals 40, i.e. the first seal 40*a* and the second seal 40*b*, and the corresponding seal grooves 50, 60 are replaced with two pairs of gate seals 40*a*, 40*a*', 40*b*, 40*b*' and two pairs of seal grooves 50, 50', 60, 60'. This embodiment comprises a first pair of seals 40*a*, 40*a*' and a second pair of seals 40*b*, 40*b*', wherein the two seal profiles 41, 42 of the embodiment of FIGS. 2A-12E) are each embodied in a separate set of seals—i.e. the first profile 41 is embodied in the first set of seals 40*a*, 40*b*, while the second profile 42 is embodied in second set of seals 40*a*', 40*b*'—as illustrated in FIGS. 13A-13F.

In a preferred embodiment, the first set of seals 40*a*, 40*b* are made of an alloy steel or a coated steel, to reduce the chance that a portion of said seals 40*a*, 40*b* is pushed or deformed into gate bore or gate opening 300 when under pressure. More preferably, the second set of seals 40*a*', 40*b*' are made of an elastomer material or Teflon™ to provide better longevity characteristics, less friction, and less force required to engage it.

In this embodiment of the gate vale 10, and as shown in FIGS. 13A-13F, the first profile 41 embodied in the first set of seals 40*a*, 40*b* is a circular profile. Further in this embodiment, the second profile 42 embodied in the second set of seals 40*a*', 40*b*' is a modified stadium profile comprising a geometric shape constructed of two semicircular members, namely a first semicircular member 44*a* and a second semicircular member 44*b* positioned at opposite ends 40*e*, 40*e*' with a pair of straight legs 45*a*, 45*b* therebetween, and wherein the end 40*e*' comprising the second semicircular member 44*b* is of sufficient diameter so as to fully encircle or encompass the first profile 41 (as embodied in seals 40*a*, 40*b*).

Figure 13A:
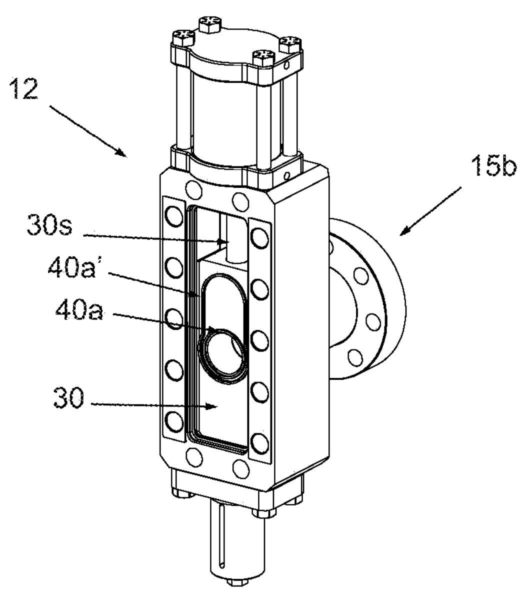
FIG. 13A is a perspective view of certain components of a gate valve according to another embodiment of the invention.
Figure 13B:
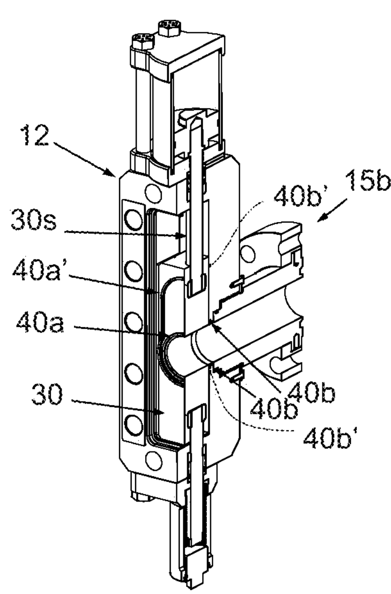
FIG. 13B is a sectioned perspective view of certain components of the gate valve of the embodiment of FIG. 13A.
Figure 13C:
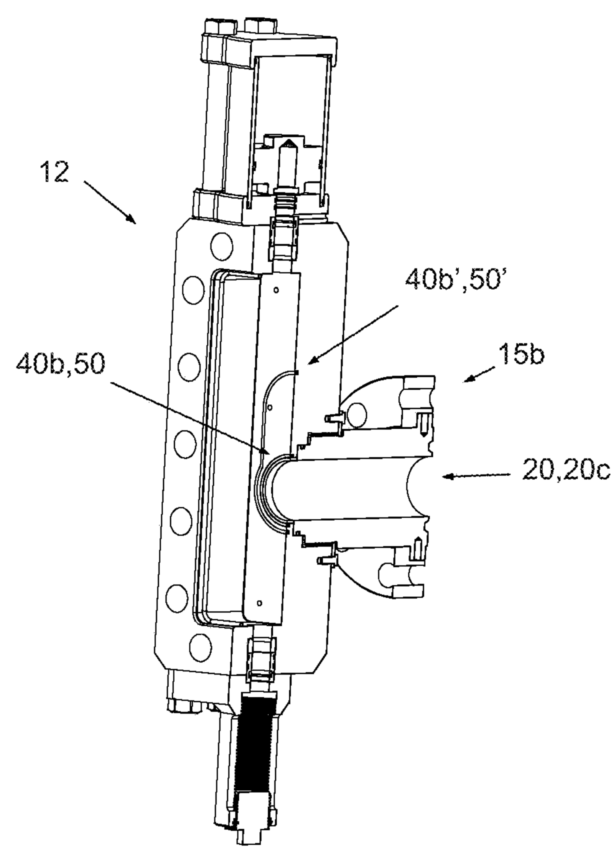
FIG. 13C is a perspective view of certain components of the gate valve of the embodiment of FIG. 13A.

The valve main body 12 further comprises a pair of body seal grooves or pockets 50,50' on the second gate cavity face 12*gf* of suitable dimensions to accept seals 40*b*, 40*b*' therein in a conventional manner; i.e. cap seal groove 50 has shape or profile that is a circular profile (to accept seal 40*b*) and cap seal groove 50' has a modified stadium profile (to accept seal 40*b*'); see FIG. 13C.

Figure 13D:
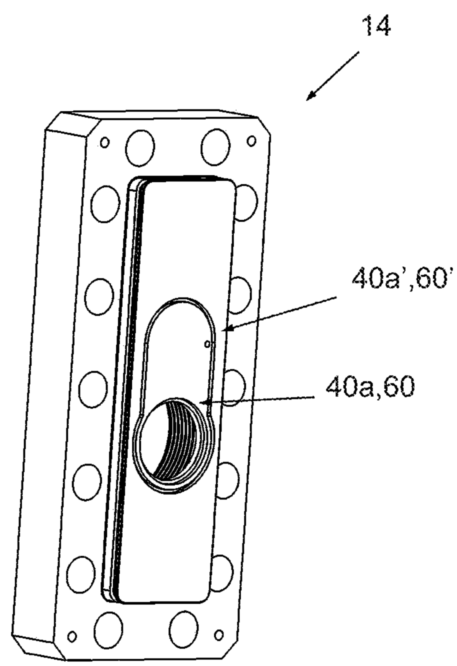
FIG. 13D is a perspective view of certain components of the gate valve of the embodiment of FIG. 13A.
Figure 13E:
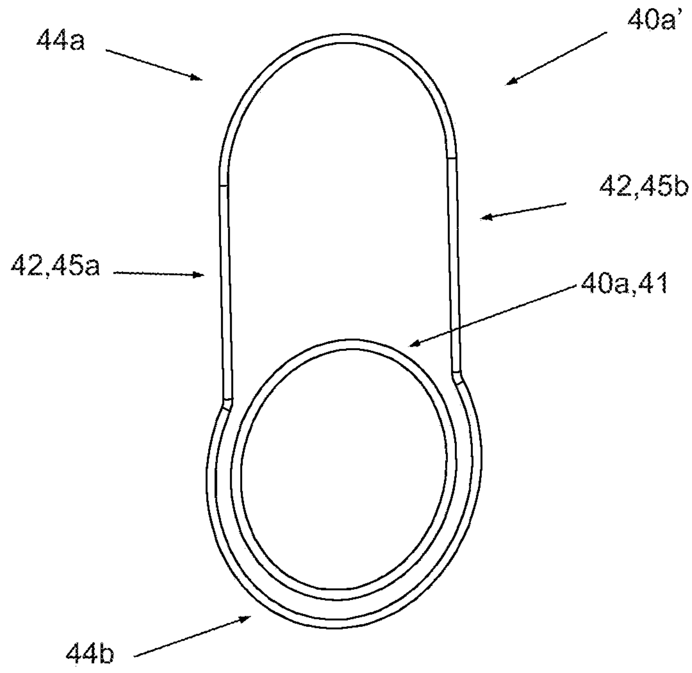
FIGS. 13E-13F are front and rear perspective views of a flow passage or gate seal of the embodiment of FIG. 13A.
Figure 13F:
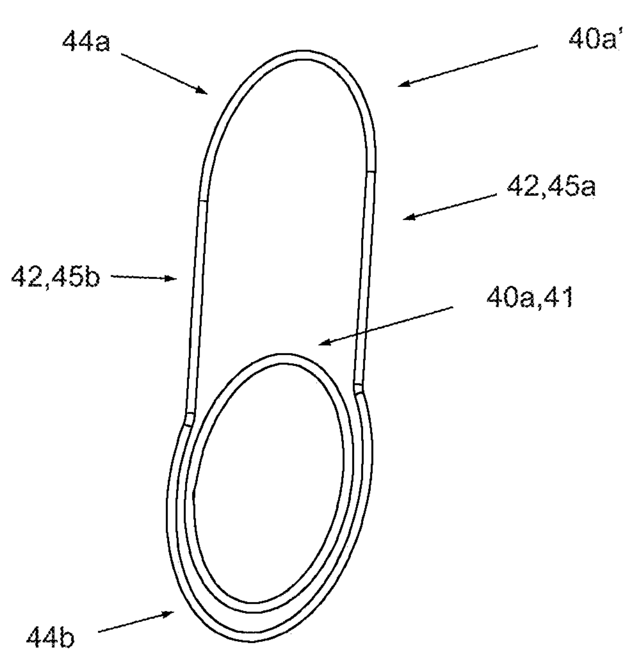

The valve end cap 14 of this embodiment further comprises a pair of cap seal grooves or pockets 60, 60' on the first gate cavity face of suitable dimensions to accept seals 40*a*, 40*a*' therein in a conventional manner; i.e. cap seal groove 60 has a circular profile (to accept seal 40*a*') and cap seal groove 60' has a modified stadium profile (to accept seal 40*a*'); see FIG. 13D.

Similar to the embodiment of FIGS. 2A-12E, the circular profile 41 of the seals 40*a*, 40*b* each have an inner diameter such that the opening in these seals is substantially commensurate with the flow passage 20 and the gate opening 300. A seal thickness is chosen so that the gate 30 engages with the seals 40*a*, 40*b* rather than the first and second gate cavity faces but wherein the seals 40*a*, 40*b* are substantially disposed within their respective pockets 50, 60. The dimensions and materials of the seals 40*a*, 40*b* are determined based on the working pressure and the contact or bearing stress. One of skill in the art will be able to readily adapt such dimensions and materials accordingly.

Similar to the embodiment of FIGS. 2A-12E, the modified stadium profile 42 of the seals 40*a*', 40*b*' have such dimensions to ensure that, as the gate opening 300 reciprocates between the open and closed configurations, it is maintained within the seals 40*a*', 40*b*'. The straight legs 45*a*, 45*b* of the modified stadium profile 42 of the seals 40*a*', 40*b*' are of such dimensions and length to ensure that the gate bore 300 is kept within the interior of that profile 42 regardless of what configuration or position the gate 30 may be in during operation of the gate valve 10; i.e. even when the gate 30 is in the closed configuration, and the gate bore 300 is moved into a position relative to the flow passage 20 such that the flow of fluid through the gate valve 10 is substantially reduced or eliminated, the gate bore 300 is still within the inside or interior of the second profile 42 of seals 40*a*', 40*b*'.

Advantageously, and similar to the embodiment of FIGS. 2A-12E, the second profile 42 in this embodiment prevents solids and debris from moving past the gate 30 and collect above the gate 30 and around the stem 30*s*. Any solids that may be within the fluid passing through the gate 10 will remain trapped within the gate's bore or opening 300, regardless of position of the gate 30 within the gate chamber 12*gc*; such solids then simply being flushed out of the gate opening 300 the next time the gate is in the open configuration.

A seal thickness is chosen so that the gate 30 engages with the seals 40*a*', 40*b*' rather than the first and second gate cavity faces but wherein the seals 40*a*', 40*b*' are substantially disposed within their respective pockets 50', 60'. The dimensions and materials of the seals 40*a*', 40*b*' are determined based on the working pressure and the contact or bearing stress. One of skill in the art will be able to readily adapt such dimensions and materials accordingly.

Figure 14:
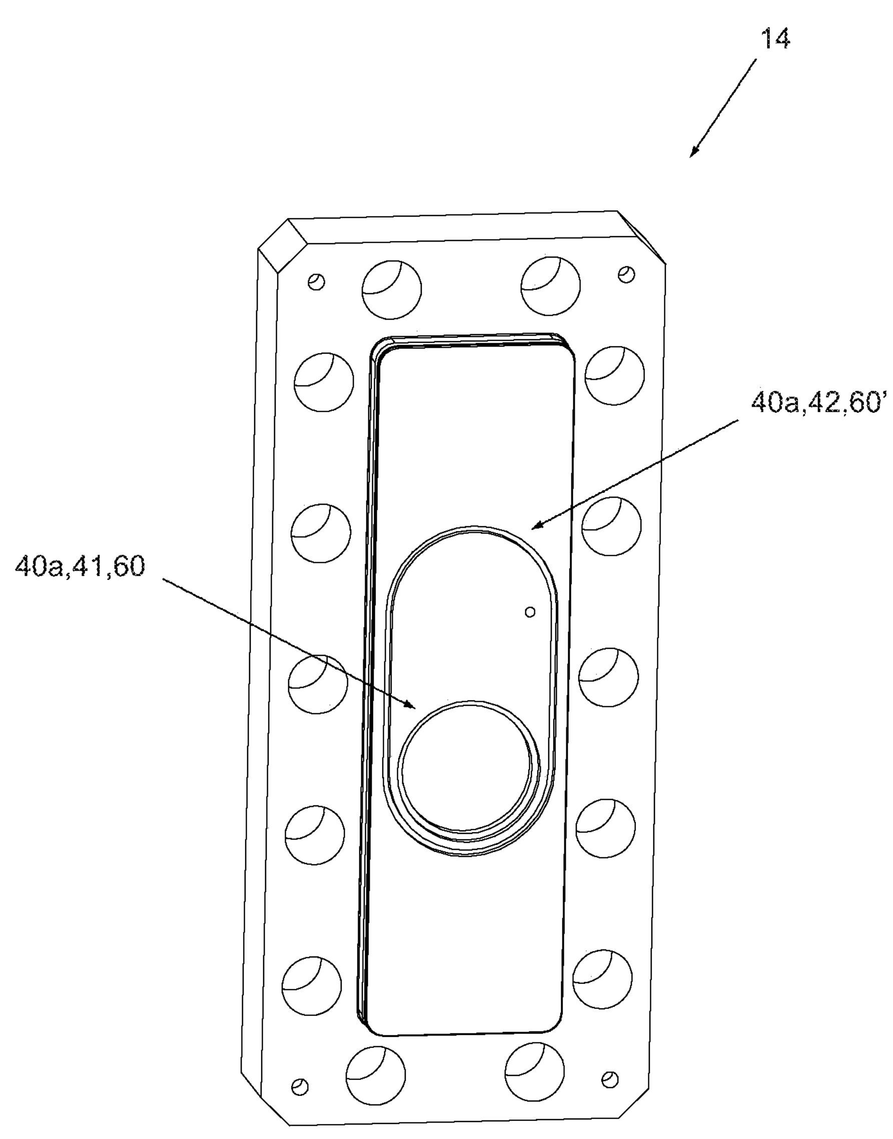
FIG. 14 is a perspective view of certain components of a gate valve according to yet another embodiment of the invention.

In another embodiment of the gate valve 10, and as shown in FIG. 14, the gate valve 10 is similar to the embodiment of FIGS. 13A-13F except that the second profile 42 of the seals 40*a*', 40*b*' is a stadium profile (not a modified stadium profile). Like the embodiment of FIGS. 13A-13F, the second profile 42 in this embodiment is of such dimensions to ensure that, as the gate opening 300 reciprocates between the open and closed configurations, it is maintained within the seals 40*a*', 40*b*'. Advantageous, the second profile 42 in this embodiment prevents solids and debris from moving past the gate 30 and collect above the gate 30 and around the stem 30*s*. Any solids that may be within the fluid passing through the gate 10 will remain trapped within the gate's bore or opening 300, regardless of position of the gate 30 within the gate chamber 12*gc*; such solids then simply being flushed out of the gate opening 300 the next time the gate is in the open configuration.

As will now be understood by those of skill in the art, the first (circular) profile of the seals, as embodied in the first and second seals 40*a*, 40*b* of the embodiment of FIGS. 2A-12E, or as embodied in the first set of seals 40*a*, 40*b* of the embodiments of FIGS. 13A-14, provide the sealing functionality of the gate valve 10 when in the closed configuration so that the flow through the gate is substantially blocked such that fluid does not pass from one side (11*a*) of the gate valve to the other side (11*b*). As will now also be understood by those of skill in the art, the second (stadium or modified stadium) profile 42 of the seals, as embodied in the first and second seals 40*a*, 40*b* of the embodiment of FIGS. 2A-12E, or as embodied in the second set of seals 40*a*', 40*b*' of the embodiments of FIGS. 13A-14, prevents solids and debris from moving past the gate 30 and collect above the gate 30 and around the stem 30*s*—i.e. the second profile 42 seals the gate opening 300 from (or relative to) the gate stem 30*s*. Any solids that may be within the fluid passing through the gate 10 will remain trapped within the gate's bore or opening 300, regardless of position of the gate 30 within the gate chamber 12*gc*; such solids then simply being flushed out of the gate opening 300 the next time the gate is in the open configuration.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The invention claimed is:

1. A gate valve (10) comprising:

a first end (11*a*) and a second end (11*b*);

a valve end cap (14) having a first mating face (14*f*);

a valve main body (12) having a second mating face (12*f*);

a gate (30) having a gate opening (300), the gate (30) positionable within the valve (10) between a closed configuration, a transition configuration and an open configuration;

a gate stem (30*s*);

at least one pair of seals (40*a*, 40*b*) comprising a first seal (40*a*) and a second seal (40*b*) wherein one of each seal (40*a*, 40*b*) is positioned on either side of the gate (30);

wherein each of said seals (40*a*, 40*b*) comprises a first profile (41) and a second profile (42);

wherein said first profile (41) seals the gate valve (10) and blocks fluid from passing between the first end (11*a*) and the second end (11*b*) when the gate valve (10) is in the closed configuration;

wherein the second profile (42) seals the gate opening (300) relative to the gate stem (30*s*); and further comprising a plurality of shims (100) positionable between the first and second mating faces (12*f*, 14*f*).

2. The gate valve (10) of claim 1 wherein the plurality of shims are provided as a paired set (100, 100').

3. The gate valve (10) of claim 1 wherein the plurality of shims are provided as a single set of shims (100*a*).

4. The gate valve (10) of claim 1 wherein the plurality of shims are provided as two sets of shims (100*a*, 100*b*).

5. A gate valve (10) comprising:

a first end (11*a*) and a second end (11*b*);

a valve end cap (14) having a body seal groove (50);

a valve main body (12) having a cap seal groove (60);

a gate (30) having a gate opening (300), the gate (30) positionable within the valve (10) between a closed configuration, a transition configuration and an open configuration;

at least one pair of seals (40*a*, 40*b*) comprising a first seal (40*a*) and a second seal (40*b*) wherein one of each seal (40*a*, 40*b*) is positioned on either side of the gate (30);

wherein each of said seals (40*a*, 40*b*) comprises a first profile (41) and a second profile (42);

wherein said first profile (41) seals the gate valve (10) and blocks fluid from passing between the first end (11*a*) and the second end (11*b*) when the gate valve (10) is in the closed configuration;

wherein the second profile (42) seals the gate opening (300) relative to the gate stem (30*s*);

wherein the body seal groove (50) accepts one of said pair of seals (40*b*);

wherein the cap seal groove (60) accepts the other of said pair of seals (40*a*).

6. The gate valve (10) of claim 5 wherein, when the gate (30) reciprocates between the open configuration and the closed configuration, the at least one pair of seals (40*a*, 40*b*) are maintained in their respective body seal groove (50) and cap seal groove (60).

7. The gate valve (10) of claim 6 wherein the second profile (42) is a stadium profile comprising a first semicircular member (44*a*) and a second semicircular member (44*b*) positioned at opposite ends with a pair of straight legs (45*a*, 45*b*) therebetween; and wherein, when the gate (30) reciprocates between the open configuration and the closed configuration, the gate opening (300) is maintained within a distance (D') between the first and second semicircular members (44*a*, 44*b*).

* * * * *